(12) United States Patent
Halstead et al.

(10) Patent No.: US 11,550,792 B2
(45) Date of Patent: Jan. 10, 2023

(54) SYSTEMS AND METHODS FOR JOINING DATASETS

(71) Applicant: Infosum Limited, Basingstoke (GB)

(72) Inventors: Nicholas Halstead, Hook (GB); Eike Spang, Basingstoke (GB)

(73) Assignee: Infosum Limited, Basingstoke (GB)

( * ) Notice: Subject to any disclaimer, the term of this patent is extended or adjusted under 35 U.S.C. 154(b) by 429 days.

(21) Appl. No.: 16/638,234

(22) PCT Filed: Aug. 10, 2018

(86) PCT No.: PCT/EP2018/071829
§ 371 (c)(1),
(2) Date: Feb. 11, 2020

(87) PCT Pub. No.: WO2019/030409
PCT Pub. Date: Feb. 14, 2019

(65) Prior Publication Data
US 2020/0242110 A1      Jul. 30, 2020

(30) Foreign Application Priority Data
Aug. 11, 2017   (GB) ..................................... 1712947

(51) Int. Cl.
*G06F 16/2455*     (2019.01)
*G06F 16/25*       (2019.01)
*G06Q 10/10*       (2012.01)

(52) U.S. Cl.
CPC ........ *G06F 16/2456* (2019.01); *G06F 16/254* (2019.01); *G06Q 10/10* (2013.01)

(58) Field of Classification Search
CPC .... G06F 16/2456; G06F 16/254; G06Q 10/10
USPC .......................................................... 707/602
See application file for complete search history.

(56) References Cited

U.S. PATENT DOCUMENTS

| | | | |
|---|---|---|---|
| 8,838,597 B1* | 9/2014 | Gottumukkala | G06F 16/901 707/740 |
| 2015/0142836 A1* | 5/2015 | Borges | G06F 16/2282 707/756 |
| 2015/0242407 A1 | 8/2015 | Frohock et al. | |

(Continued)

FOREIGN PATENT DOCUMENTS

EP          1708099 A1     10/2006

*Primary Examiner* — Mohammad S Rostami
*Assistant Examiner* — Saba Ahmed
(74) *Attorney, Agent, or Firm* — BainwoodHuang

(57) ABSTRACT

A method of joining a first dataset configured to store a set of data entries each identified by a respective key of a first type and a second dataset configured to store a second set of data entries identified by a respective key of a second type, the method comprising: selecting an intermediate mapping entity from a set of possible intermediate mapping entities, each mapping entity storing association between keys of the first type and keys of the second type; providing the selected intermediate mapping entity for use in joining the first data set with the second data set; wherein the step of selecting the intermediate mapping entity is based on the intersection weight between the first and second data sets via each of the intermediate mapping entities, wherein the intersection weight is the proportion of overlapping data entries between the first and second datasets.

17 Claims, 19 Drawing Sheets

(56) References Cited

U.S. PATENT DOCUMENTS

2017/0075898 A1* 3/2017 Deshpande ........... G06F 16/288
2018/0075104 A1* 3/2018 Oberbreckling ...... G06F 16/248

* cited by examiner

```
columns:
  hashed_pid: BYTES
  debt: UINT64
  storecard_balance: INT64
  credit_score: DOUBLE
  have_life_insurance: BOOLEAN
  number_of_credit_cards: UINT64
  address_1: TEXT
  address_2: TEXT
  address_3: TEXT
  post_code: TEXT
keys:
  - hashed_pid
credentials:
  user: dev
  password: dev
  database: database1
  address: 192.168.1.130:3306
redaction_threshold: 1000
bin_redaction_threshold: 100
max_database_connections: 151
store: mysql
executors: 4
```
~56

FIG. 7a

SYSTEMS AND METHODS FOR JOINING DATASETS

FIELD

The present invention relates to accessing databases, and particularly but not exclusively to joining datasets using one or more intermediate mapping entities.

BACKGROUND

It has long been the case that it has been possible to query databases holding data to provide a response to the query. Queries are run on databases to find a match for the information being requested responsive to the query. For example, a user providing the query might want to know how many entries in a particular database satisfy a particular requirement, for example, an age range or gender requirement. There are numerous technologies available to handle this. It is becoming an increasing requirement however to use more than one database to satisfy a single query. This can be for multiple reasons. It may be advantageous to access more than one data set due to the extra information that can be gained in doing so. Queries may be more complex, and have more expressions requiring a match. Some expressions may be fulfilled by one database, whereas other expressions may relate to information or data held in a different database.

According to one technique, the two independent datasets are firstly merged together so that they exist as a single dataset which can then be queried with the multiple expressions. This procedure can require the transfer of large amounts of data, and a complex merging exercise at the receiving end. Further, it requires that the two datasets identify entries by the same type of key (e.g. "name"), in order that entries in the first dataset can be correlated with entries in the second dataset. Mapping between two datasets is known, as in D. Deng, R. C. Fernandez, Z. Abedjan, S. Wang, M. Stonebraker, A. Elmagarmid, I. Ilyas, S. Madden, M. Ouzzani, and N. Tang, "The Data Civilizer System" 8th Biennial Conference on Innovative Data Systems Research (CIDR 2017).

SUMMARY

Dataset joining allows queries to be run over a "joined" dataset to provide more valuable output than any of the datasets themselves could individually provide. To do so, however, some way of correlating the data entries is required.

Consider two datasets to be joined: one storing health data, the other storing financial data, each for a set (not necessarily the same set) of people. If the people in each dataset are identified by their name, then joining these datasets is trivial because a particular persons financial and health data can easily be identified. However, if the health data are identified by "name" in the first dataset and the financial data are identified by "social security number" in the second dataset, no such direct correlation is possible.

Embodiments of the present invention which are described in the following address some or all of these issues. That is, the present invention provides a method of joining such datasets in which data entries are identified by different keys.

According to one aspect of the present invention, there is provided a method of joining a first dataset with a second dataset, the first dataset configured to store a set of data entries each identified by a respective key of a first type and the second dataset configured to store a second set of data entries identified by a respective key of a second type, the method comprising: selecting an intermediate mapping entity from a set of possible intermediate mapping entities, each mapping entity storing association between keys of the first type and keys of the second type; providing the selected intermediate mapping entity for use in joining the first data set with the second data set, wherein the step of selecting the intermediate mapping entity is based on the intersection weight between the first and second data sets via each of the intermediate mapping entities, wherein the intersection weight is the proportion of overlapping data entries between the first and second datasets.

In some scenarios, the step of selecting an intermediate mapping entity comprises locating a plurality of possible mapping entities and defining multiple paths from the first dataset to the second dataset, each path including at least one of the mapping entities.

In this case, the method may comprise the step of determining whether to use a single best one of the multiple paths or more than one of the multiple paths.

When it is determined to use a single best paths, the method may comprise the step of determining a respective set of path parameters for utilising each of the multiple paths, and selecting the best single path based on optimising a heuristic of the set of path parameters.

The path parameters can include quality and speed of executing a join using the single best path.

In one embodiment, the method comprises the step of determining an overlap intersection weight between an intermediate mapping entity of a first one of the multiple paths and an intermediate mapping entity of a second one of the multiple paths in each set of possible multiple paths, and determining which set of multiple paths to utilise based on the overlap intersection weights.

The method can comprise the step of using the overlap intersection weights to determine that a single best path should be utilised.

The intersection weights may be stored in a data structure in which each intermediate mapping entity is held in association with its intersection weights between each of the first and second datasets.

In some embodiments, the step of selecting is based on a first intersection weight which represents the overlap in a first direction from the data set to the intermediate mapping entity. The step of selecting may be further based on a second intersection weight in a second direction from the intermediate mapping entity to the data set.

The proportion of overlapping data entries may be based on the absolute number of overlapping keys with the intermediate mapping entity, relative to the size of the dataset. Alternatively, the proportion may be the number of overlapping keys as a percentage of the size of the source dataset.

The step of selecting the intermediate mapping entity can comprise locating a plurality of possible intermediate mapping entities, determining for each of the possible intermediate mapping entities the intersection weight between the first data set and the intermediate mapping entity, and between the second data set and the intermediate mapping entity, and selecting a preferred intermediate mapping entity by comparing the combined intersection weights between the first and second data sets and each intermediate mapping entity and selecting the greatest combined intersection weights.

In a particular application of the method, the method comprises joining the first data set with the second data using multiple selected intermediate mapping entities. The method can alternatively comprise: a first step of joining the first data set with the second data set using one of the multiple intermediate mapping entities, and a second step of joining the first data set with the second data set using a second one of the multiple intermediate mapping entities; combining joined entries resulting from the first and second steps.

When used to join datasets, the method can comprise: accessing the selected intermediate mapping entity to transform the set of keys of the first type into a generated set of keys of the second type; supplying the generated set of key of the second type to the second data set to cause a second data set to: determine at least one second data entry which identified by a key of the second type which matches one of the set generated set of keys of the second type; return the at least one second data entry for joining with a first set of data entries identified by the set of keys of the first type.

According to another aspect disclosed herein, there is provided a computer comprising: a memory holding a data structure which stores intermediate mapping entities in association with intersection weights between the intermediate mapping entity and each of first and second datasets, and a processor configured to execute a computer program which when executed carries out the method as hereinabove defined.

The memory may additionally hold for each intermediate mapping entity intersection weights with other intermediate mapping entities.

For a better understanding of the present invention and to show how the same may be carried into effect, reference will now be made by way of example to the following drawings.

BRIEF DESCRIPTION OF DRAWINGS

FIG. 7a is an example of the configuration file as illustrated in FIG. 7;

DETAILED DESCRIPTION

Nowadays every company holds valuable data, for example concerning attributes of consumers or potential consumers who may wish to access that data. Different departments within the same company, or among different companies may store data at different locations, and thus moving data across sites poses a challenges because different companies' storage formats are often not compatible and therefore increases the complexity in sharing customer data. In particular, it would be desirable to be able to correlate data entries stored in two (or more) datasets even when they use different keys to identify the data entries.

Figure 1:
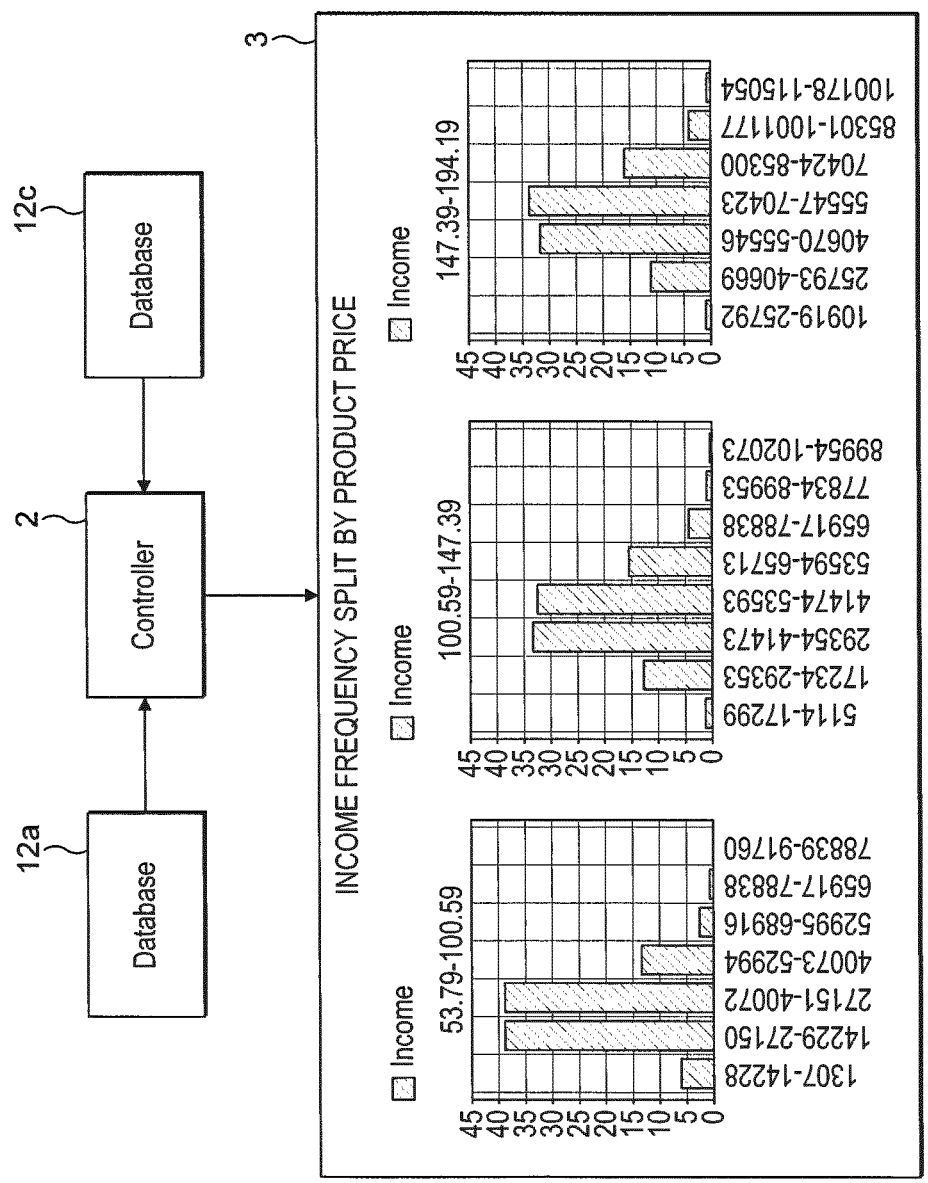
FIG. 1 is a schematic diagram illustrating a data joining system at a high schematic level.

FIG. 1 is a schematic diagram of a relating to methods of joining two databases. Note that herein the term "database" is used to refer to a storage location and the term "dataset" is used to refer to an actual set of data entries. Hence, a dataset may be stored in one or more separate databases (e.g. a fragmented dataset). Commonly, however, a database stores a dataset and hence these terms are sometimes used interchangeably. This will be clear from context. Reference numeral 12a denotes a first database (e.g. a database of a financial organisation) which holds certain attributes within its records (entries). Reference numeral 12c denotes a second database (e.g. a database of a retail organisation) which holds certain attributes within its records (entries). The attributes in one database may be different to the attributes in the other database. Some entities may exist in both databases, and the challenge is to combine knowledge from both databases by joining data in a fully privacy compliant way without any records leaving each company's data centre. Reference numeral 2 denotes a controller which provides such a data joining service. An example output graph visible to a user is denoted by reference number 3; in this example it provides information on the spending habit of customers categorised by their annual income.

Figure 2:
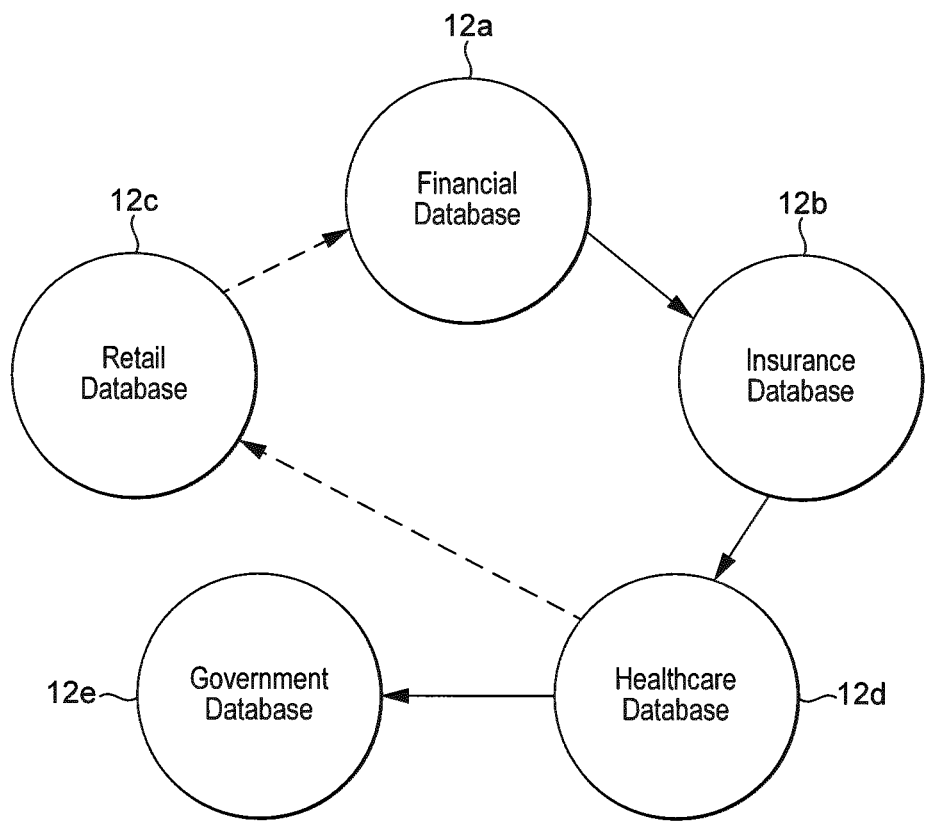
FIG. 2 is a diagram illustrating the method of data joining.

FIG. 2 shows schematically how data joining works for a data joining system with three organisations (Healthcare, Retail and Financial) shown by the dotted arrow, and for four organisations shown by bold arrows (Government, Healthcare, Insurance and Financial). In any case, queries can be created according to the existing datasets at each of the queried companies, in order to fully utilise all of the data available. A suitable filter, such as a list of hashes or Bloom filter, is created from a first query to be applied to one or more of the fields within each dataset to filter entries that does not correspond to a second query. Those matching entries in the dataset are then send back to the cloud as returned data. The joining of combined datasets creates greater knowledge than a single database can offer on its own and in some cases allow new datasets to be created. Common identifiers (or joining factors), such as email address and telephone number, are used to identify data associated with a particular entry across different datasets. In some cases different common joining factors may be use depend upon their availability in the target datasets. The final results as presented to the user can be originated from any one of the queried organisations, but each of the returned data can be configured to meet individual privacy/redaction policies.

Data joining as described herein may be employed to join internal data from databases belonging to the same entity, external data from databases owned by a plurality of entities, or data from databases physically located across different countries. For example when joining internal data, the data joining system according to examples described herein provides a solution to combine datasets that are not allowed to be cross-contaminated, or are intentionally segregated by access restrictions, internal policies and regulations. It is also useful for joining many internal databases that are too large to be managed in a single instance, or combine knowledge of different databases across a large corporation. When deployed to join external datasets, the data joining system allows the companies to benefit from pooling their knowledge and therefrom creates new datasets, as well as to acquire knowledge of sensitive data that would not normally be shared. Furthermore, the data joining system allows data to be sold into newly created market places. In some cases the use of the data joining system overcomes juridical restrictions and allows data to be exported from a particular jurisdiction. The data joining system is also useful for joining datasets that are time consuming to synchronise or technically impractical to move among different countries.

Databases which can be accessed using the data joining service form a data joining network. As more companies subscribe to the data joining network, they each form a node on the network and become a part of a combined dataset that incorporates many small datasets, e.g. the data joining network may act as a central database. Furthermore, there is no limit to the number or size of the combined datasets across the subscripting companies, whilst each of them remain in control of who they wish share their knowledge with.

Figure 3:
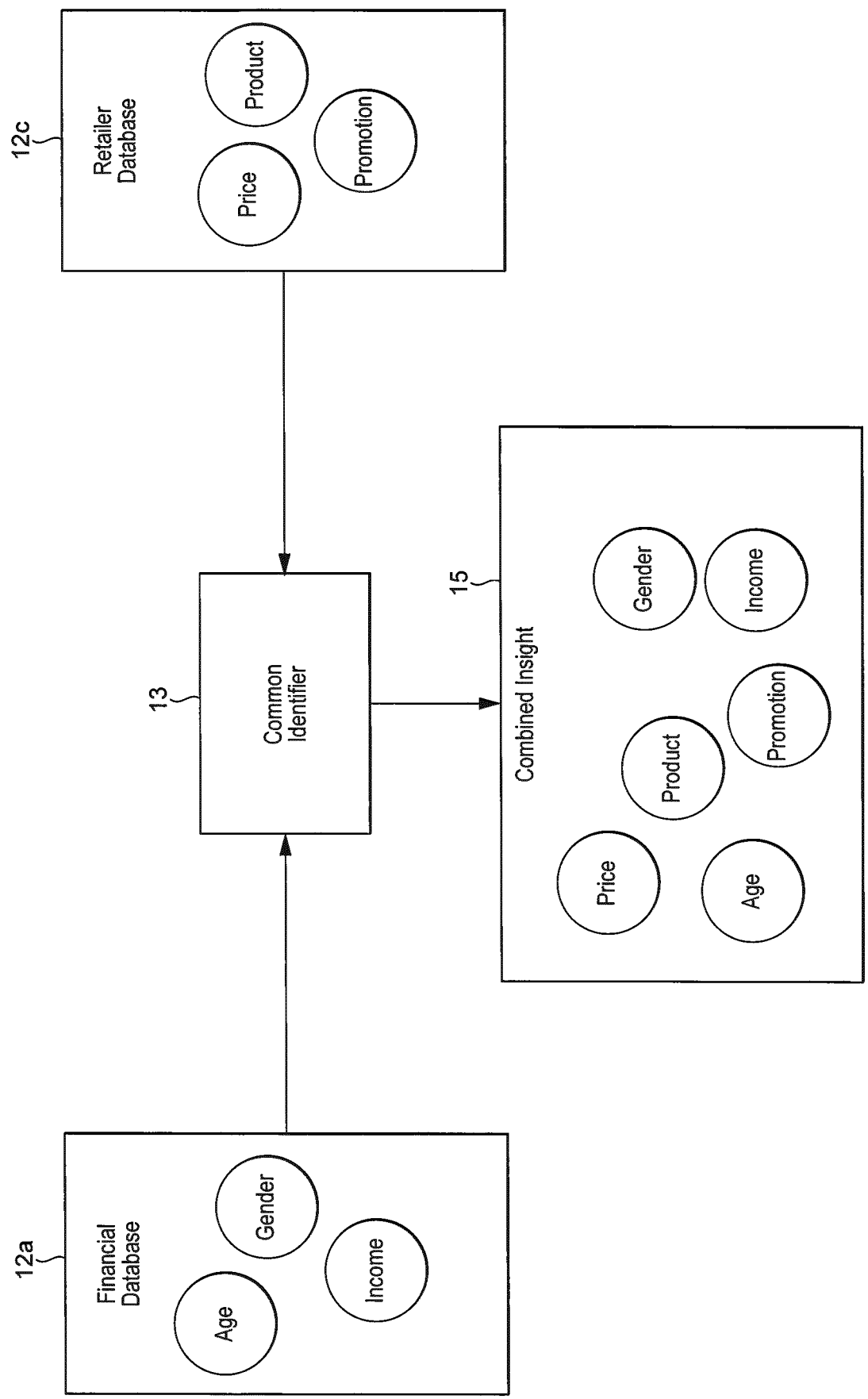
FIG. 3 is a schematic diagram illustrating a specific example where customers' transaction data is joined with their corresponding demographics data from two independently controlled databases.

FIG. 3 illustrates an example in which entries in both database 12a and database 12c use the same type of key, i.e. have a common identifier 13. This is for the purposes of explanation, and methods pertaining to scenarios in which such a common identifier is not present are described in more detail below. In this specific example where a retailer cross-examines customers' transaction data and purchase history (e.g. price, product and promotion of past purchases) with their corresponding demographics data (e.g. age, gender and income) from a bank's dataset, using email addresses as a common identifier 13 (or joining factor). This provides a combined insight of customers 15 and allows the retailers to create bespoke promotion strategies for their target customers. For example, the combined dataset between the bank and the retailer reveals which promotions are used most frequently by different aged customers and based thereon tailor promotion strategy.

In cases where the returned data is given in statistical form, customer records associated with the returned data never leave the owners' database. Moreover, the statistical data can comply with redaction rules to protect each individual customer's identity. Redaction control can be applied over the whole database or individual data fields.

The controller 2 can be embodied in the 'cloud' to provide a cloud service that facilitates data joining. The cloud service stores instructions for data acquisition (e.g. filtering expressions), but not the actual returned data. Moreover the queries can be controlled in real time and so they can be terminated as required.

In terms of access control, each sharing database is given its own set of access control so to allow bespoke control on who they wish share their knowledge with. This prevents accidental sharing of commercial sensitive data that would otherwise be detrimental to the owner of the sharing database. Restriction may also be imposed on queries requesting sensitive combination of fields in the dataset.

As mentioned above, there may be no common identifier 13 between the datasets. The described embodiments of the present invention allow data from multiple discrete databases to be combined even in these cases.

Figure 4:
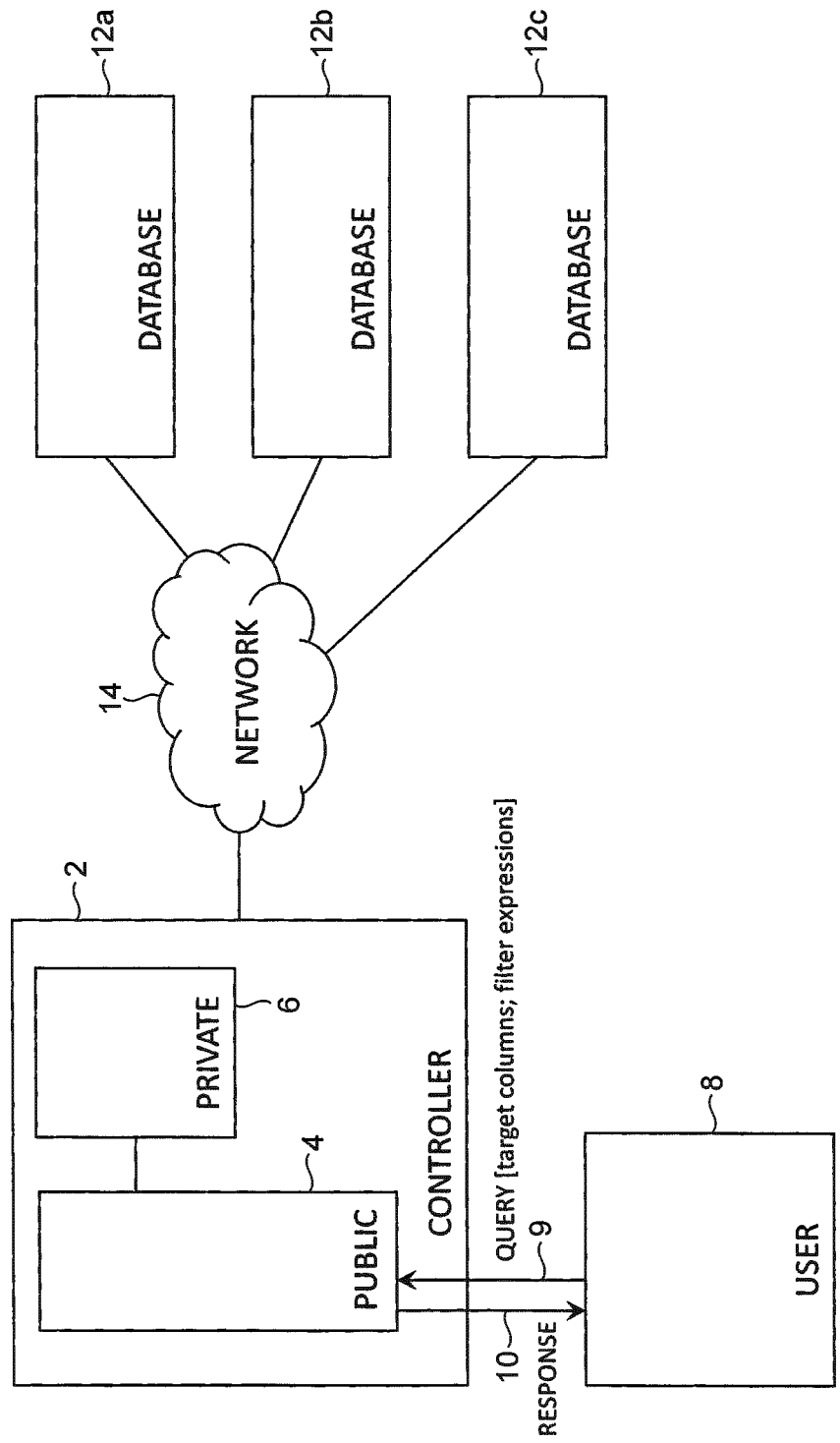
FIG. 4 is a schematic diagram illustrating a possible architecture for implementation of some embodiments.

FIG. 4 is a more detailed schematic block diagram of a system in which data from multiple discrete databases can be combined upon receiving a query from a querying user. The system comprises the central controller 2 which has a publically accessible component 4 and a set of private components 6 which implement a data combining process. The central controller can be implemented by software, firmware or hardware or any combination thereof. It could be a single server executing a computer program, or distributed over multiple servers, each running a load computer program, autonomously or in a distributed computing fashion. A user 8 has access to the controller 2 via a public interface, for example, which can be an application programming interface (API) in the controller 2. A user could be in contact with a controller 2 in any other way. Reference to a user herein refers to a user and/or a user device which can be any suitable computer device capable of generating and exchanging electronic messages. In particular, a user can generate a query 9 which he wants to run over multiple databases. That query can be generated by a human user providing manual input at an interface of a computer device, or it can be generated autonomously and automatically by a computer device itself.

The databases 12a-12c shown in FIG. 4 are examples of databases which may not share common keys, as mentioned above. For example, the user 8 may wish to join database 12a with database 12b in order to run a query over the aggregated data. The data aggregation is trivial when the databases do share a key, and the described embodiments of the present invention relate to systems and methods of allowing the user to perform such "multi-database querying" even when the databases do not share a key.

Example queries are given later, together with examples of results of the queries delivered to the user.

The user 8 receives a response 10 following data combining processes carried out at the controller 2. The response 10 can take the form of a set of target entries resulting from combining the entries in the databases which satisfy expressions in the query. Alternatively, the response 10 can take the form of aggregated data as described in more detail herein, shown for example in a graphical format. The controller 2 is connected to multiple databases 12a, 12b, 12c. It can be connected via any suitable communication network 14, which could be a private Intranet or public Internet. Before going into a more detailed description of the architecture of the system, the basic principles of the data combining process will now be described. For this, reference is made to FIG. 5 in which multi-database querying with matching keys is first described for ease of understanding. Multi-database querying with non-matching keys is described in more detail below, once the general principles are described.

Figure 5:
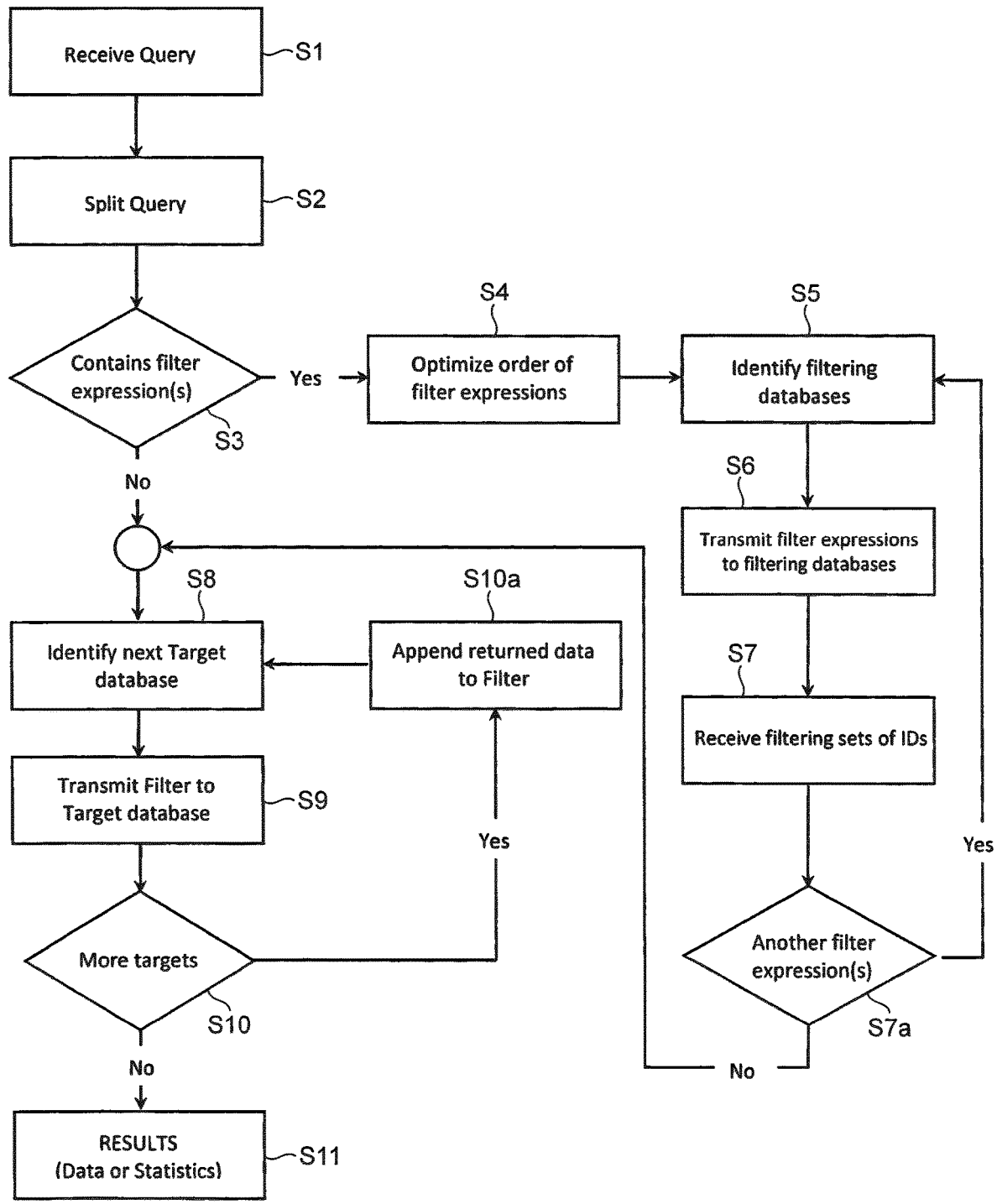
FIG. 5 is a flowchart illustrating processes carried out at a central controller.

As illustrated in FIG. 5, the first step of the process is the receipt of a query by the central controller 2 from the user 8, step S1. The query 9 comprises one or more target "columns" to receive data or statistics, and a set of filter expressions which the data or statistics should satisfy. For example, the query could ask for the number of data entries satisfying a certain age range and certain gender specification. Some examples are given later by way of illustration not limitation.

At step S2, the query is split into two queries, which are referred to herein as a filtering query and a target query. At step S3, a check is made to see whether or not the filter query contains filter expressions. If it does, the flow moves to step S4 where an order of the filter expressions is optimised. The purpose of this optimisation is to determine an order in which filter expressions are to be submitted to one or more database, as discussed in more detail later. At step S5 filtering databases are identified, each database being selected as the most appropriate database to deal with the particular filter expression. The central controller 2 stores information about all the databases to which it has access to allow it to identify appropriate filtering databases. This information is stored using a drone graph (44 in FIG. 7) described later. Each database is associated with a drone, which serves as a database agent on the software side. For example, the controller can identify which of the databases contains information related to the required filtering expression. At step S6, each filter expression is sent to the most appropriate database. When the first filter expression is sent to the first filtering database, it is run against the database to identify entries in that database matching the terms of the filter expression. For example, if the first required expression is an age range between 18 to 25, a filtering set of identifiers is returned from that database identifying database records satisfying the expression, for example, all the entities in the database aged between 18 to 25. Thus, the age range has produced a filtered set of identifiers. This filtered set can then be transmitted to a subsequent filtering database to act as a filter along with the next filter expression of the query, wherein the next filter expression is compared only to the entries in the database which satisfy the identifiers of the filtered set. Step S7 denotes the function of receiving the filtering sets of IDs, and step S7a the determination of whether there are additional filtering expressions. Once all filtering expressions have been utilised and run against their respective filtering databases, a final filtered ID set is produced. The process then moves to step S8 where a target database is identified for execution of the target query. For example, the target query in this case could be gender-based, for example, identify all females. In step S9, the filtered dataset and the target query are applied to the identified target database where the target query is run only against the identifiers which satisfy the identifiers in the filtered dataset. Note that a single filter expression can be sent to multiple databases, or multiple filter expressions can be sent to a single database. Note also, that in some cases there may be no filtering expressions (step S3) in which case the target query is just passed straight to one or more target database. It is important to recognise that no data records are transferred, only record IDs.

Note that there may be more than one target database, as well as or instead of, multiple filtering databases. Thus, a database could both produce a result set of record data and a filtering set of identifiers for a subsequent query. Note that one expression may be run against multiple databases, for example when more than one database satisfies the expression, but perhaps with incomplete records.

Step S10 checks for whether there are any more target queries or more target databases that need to be addressed with the target query and in the case that they are, the returned data is appended to the filter S10a and steps S8 and S9 run again on the next target database.

When all target databases have been queried, the final results are returned in step S11. Note that the results may be actual data entries, or aggregated statistics, depending on the context in which the method is applied. For example, "real data" could be provided in the results in a company internal implementation, while aggregated statistical results could be provided for public usage, for reasons of security and anonymity.

Figure 14:
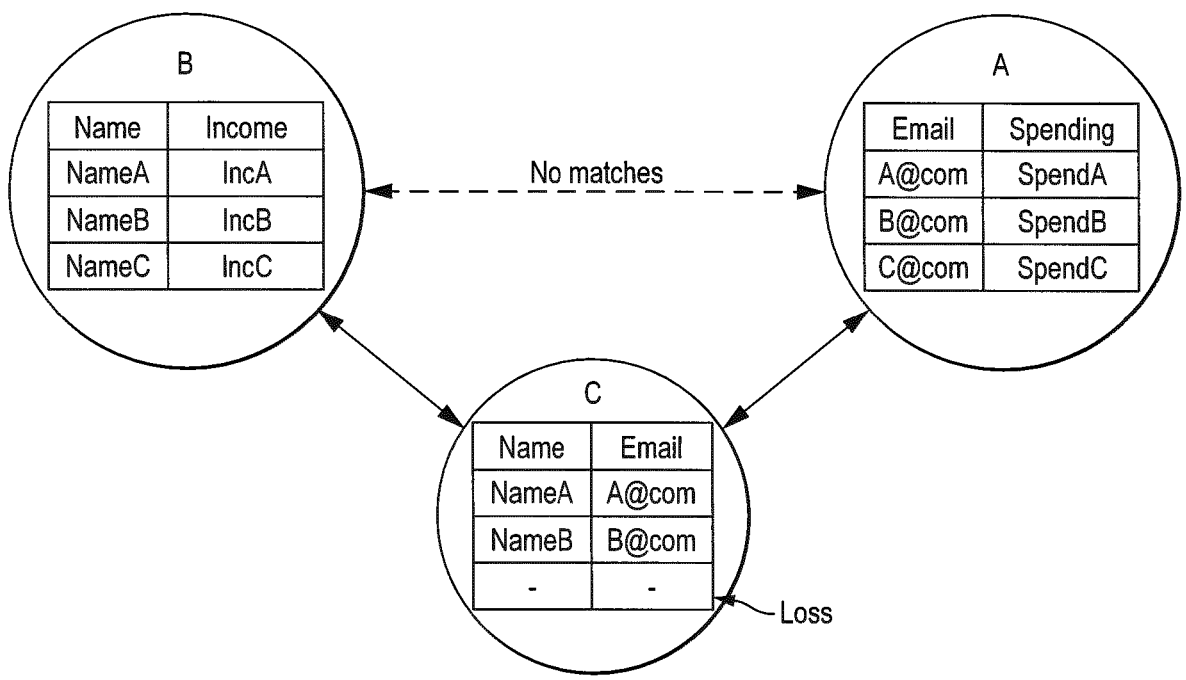
FIG. 14 illustrates dataset joining using an intermediate dataset.

As mentioned, in FIG. 5 it is assumed that the set of identifiers (keys) which is used to address the second database will allow entries in that database to be identified. However, there are situations that can arise where the key in the first database is of the first type, and the key in the second databases of the second type. For example, the key of the first database might be names, and the key of the second database might be email addresses. FIG. 14 illustrates this situation. In this case the source database B (e.g. database 12b) and the end database A (e.g. database 12a) do not have keys of a common type. A solution to this is to provide intermediate mapping entity C, which can itself be a database (e.g. database 12c) or any other mapping entity. This entity maps keys of the first type (in this case names) to keys of the second type (in this case email addresses). This allows the databases B and A to be joined, via the intermediate mapping entity C.

Figure 6:
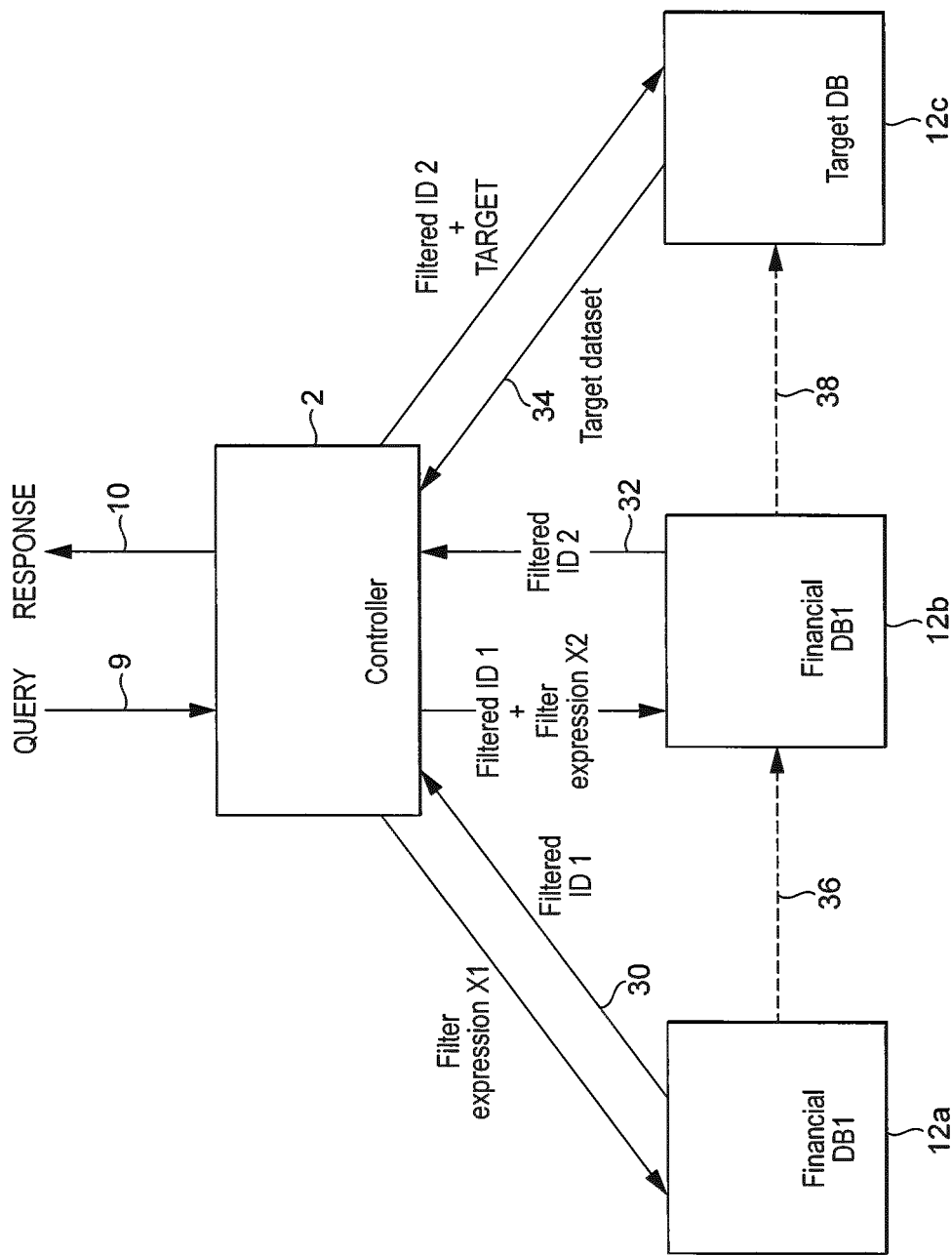
FIG. 6 is a schematic diagram illustrating the flow of FIG. 5.

FIG. 6 is a schematic architectural diagram which gives one example of the flow described with reference to FIG. 5. As shown in FIG. 6, a query 9 is received at the controller 2. In this case, the controller 2 splits the query into three separate queries, a first query with a first filter expression X1, a second query with a second filter expression X2, and a third target query with a target expression TARGET. As an example, the first filter expression could be an age range (e.g. between 18 to 25), the second filter expression could be income (e.g. more than £60,000) and the target expression could be gender (i.e. all females). The first query with the first filter expression X1 is sent to the first database 12a of a financial organisation labelled Financial DB1. This database is determined by the controller as being the best database for establishing data entries fitting a certain age range. A filtered set of IDs 1, 30, is returned to the controller 2. This filtered ID set includes record identifiers or records from the filter database Financial DB1 satisfying the first filter expression (that is, all data entries fitting the age range between 18 to 25). The filtered ID set 1 can comprise a list of hashed identifiers, where each identifies a data entry in the database, or can be a bloom filter, counting bloom filter or the like.

A bloom filter is commonly applied to test whether an element (e.g. one of the identifiers) is a member of a set. The set is a list of all identifiers and each identifier identifies one or more rows, which might be the database. More specifically, a bloom filter tests whether an element is certainly not present and therefore remove the need to seek elements that don't exist in a set. A query returns a result of either "possibly in set" or "definitely not in set". A bloom filter is particularly useful if the amount of source data would require an impractically large amount of memory if "conventional" error-free hashing techniques were applied. Moreover, the original used list of hashes cannot be generated from the filter, so it provides another level of anonymity.

A bloom filter comprises a bit string of length n onto which has been encoded information about a set of data values. The (n) bits of the bloom filter are all initialised to 0. A data value is encoded onto the filter by applying a set of k hash functions to the data value which each return (modulo n, if the algorithm allows for results greater than k) a respective integer between 1 and n (that is, the data value is transformed into a set of k integers) which are then interpreted as positions within the bit string. The bits at these (k) positions are then re-written to 1. Further data values can be written to the (same) bit string using the same method. If one or more of the hash functions, when writing a further data value, points to a bit in the filter which is already 1 (i.e. written to encode some earlier data value), it remains a 1 after writing the further data value.

Note that k can be equal to 1 (though it usually greater). That is, a single hash function may be used.

The bloom filter, once written, allows for the quick determination that a test data value is not a member of the original (encoding) set. To do so, the same k hashes are performed on the test value. If any one of the bits in the string at those locations is a 0, the test value was not a member of the original set (otherwise this bit would have been rewritten as a 1). False positives, however, are possible because the k hashes of the test value could by chance point to locations in the string which were indeed written during encoding, but in the context of determining intersection of datasets, this does not significantly impact the usefulness of results.

Another example of a data structure is the result of a hyperloglog algorithm applied to the data sets. A hash function is applied to each data entry of a dataset to obtain a set of hashes which are assumed to be uniformly distributed random numbers. The set is divided into smaller subsets (each of which may be stored in a register), and the maximum number of leading zeroes is calculated in each subset. This gives an estimate of the cardinality of each subset according to the hyperloglog theory that if the maximum number of leading zeros is n, an estimate for the number of distinct elements in the set is 2 to the power n. By merging the subsets of multiple data sets, an indication of the intersection can be provided.

Figure 20:
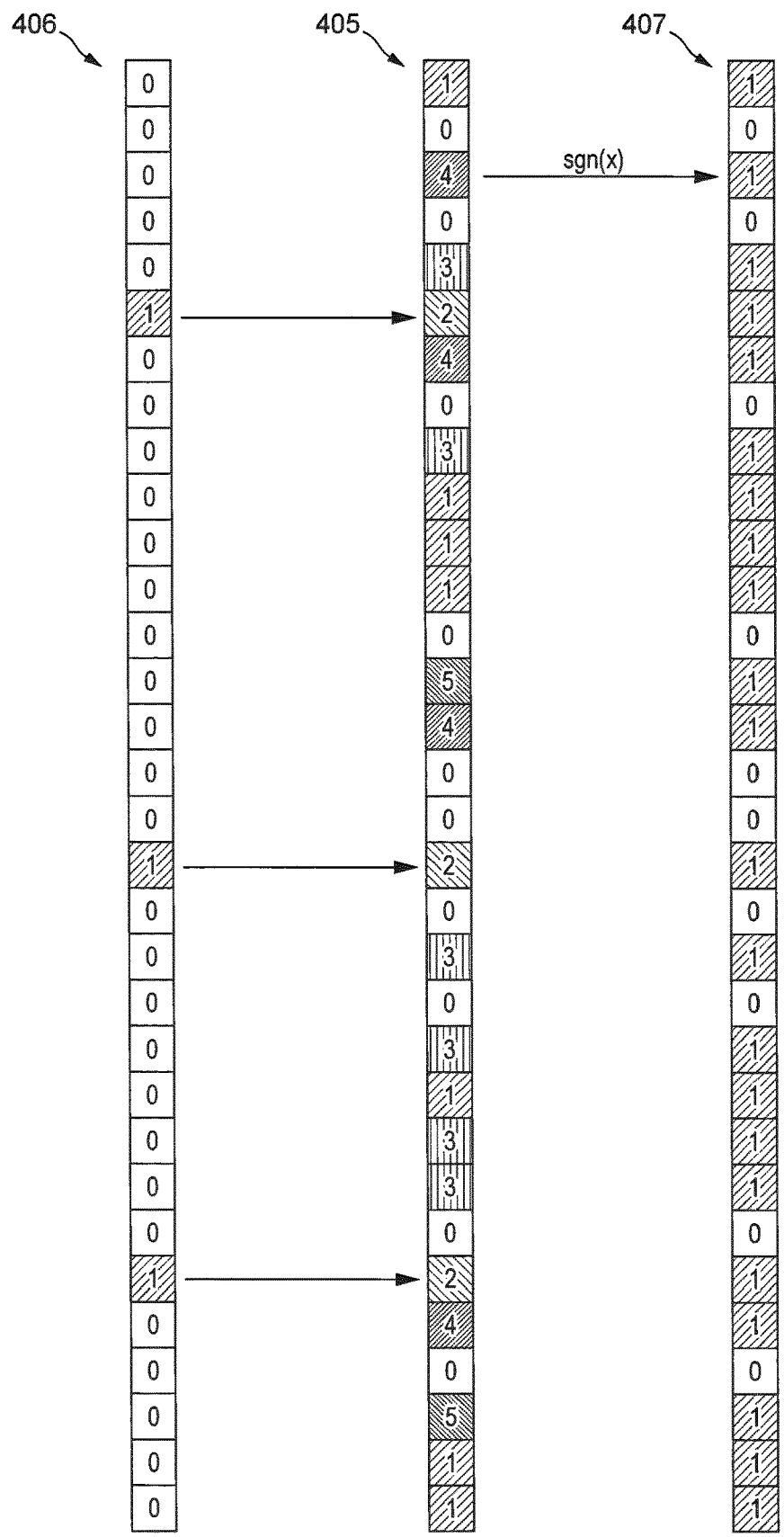
FIG. 20 illustrates various example bloom and counting filters.

Another example is a counting filter (sometimes called counting bloom filter) which is an extension to the bloom filter concept which keeps track of the number of data entries written to it. FIG. 20 illustrates an example counting filter 405. The filter 405 is constructed by writing to position values in the manner described above, but without each position being restricted to a single bit. That is, each position can be, e.g. a 4-bit number, which is incremented each time it is written to. Hence, if the same value using, e.g. three hash functions, is written to the counting filter 405 four times, the three locations in the filter corresponding to the hash values will each be set to four (barring extra data writing).

A counting filter is usually implemented for its advantage in allowing delete operations (i.e. entries can be removed from the counting filter without having to reconstruct the entire filter, as one would have to do with a bloom filter). However, the present invention recognises a further advantage of using a counting filter, as explained below.

With reference to the intersection determination described above, note that a data entry in one dataset may in fact "match" with more than one data entry in a second dataset. For example, a first dataset with health data identified by name keys may including an entry such as "John Smith, [health data]". If a second dataset comprises financial data identified by name keys but stored as separate entries per financial year (e.g. "John Smith, [financial data 2016]" and "John Smith, [financial data 2017] as separate entries), then it may be useful to know not only that the health data entry does match an entry in the financial dataset, but that it in fact matches two data entries. This information is lost in a standard bloom filter because both of the entries in the second dataset are identified by the same key and therefore produce the same set of (one or more) hash values. A counting filter, on the other hand, allows to keep track of how many entries are written to it and therefore an indication of how many matches there are with a given key can be determined, rather than just an indication that there is or is not a match.

For example, consider the bloom filter 406 shown in FIG. 20 which may represent a single data value written to the bloom filter 406 using three hash functions. Hence, the bloom filter 406 comprises three "set" bits, and the rest "unset" bits. This bloom filter 406 may represent the data in a first dataset and the counting filter 405 may represent the data in a second dataset. To compare the first and second datasets, the bloom filter 406 can be compared with the counting filter 405. In this example, it can be determined that the data value of the first dataset is present twice in the second dataset, because each of the locations is set to "2" in the counting bloom filter 405. In general, the number of occurrences in the second dataset can be determined as the minimum value of the values in the counting filter 405 which correspond to locations in the bloom filter 406 which are set to "1".

To compare the entire bloom filter 406 with the counting filter 405, the sum of the values in the counting filter 405 at locations where the bloom filter 406 is set to "1" can be divided by the number of hashes. This may be rounded down to the nearest integer. In this example, the sum is 2+2+2=6 and the number of hashes is 3, thus giving 2 as the (estimated) total number of occurrences of values from the bloom filter 406 in the counting filter 405. Note that even though bloom filter 406 in this example is written by only one data value, this method applies to bloom filters written by more than one value.

A bloom filter can be constructed from a counting filter. FIG. 20 also shows a bloom filter 407 constructed from the counting filter 405, which can be done by applying the Signum function sgn(x) in a bit-wise fashion. This is a one-way operation.

In any case, the filtered ID set 1 and the second query with the second filter expression X2 is then addressed to the second database 12b of another financial organisation labelled Financial DB2. This database has been identified by the controller as being a good database for extracting income-related data.

The query which is run over the second filter database is a query which matches the second filter expression X2 against only those database entries identified by the filtered ID set 1. This is therefore potentially a faster query to run and might reduce the amount of data to transfer. Moreover, note that there has been no requirement to "join" the records of the first and second filter databases into a common dataset. Thus, these databases can be completely independent, logically and/or geographically and do not have to have any common control or ownership. Note also that no raw data (database records) is expected.

A second filter ID set 2, 32, is returned to the controller 2 following the query which is run on the second filtering database Financial DB2 12b. The controller 2 sends the second filter ID set 2 and the target expression to a target database which it has identified. The result 34 of running the target expression TARGET against the identifiers in the filter dataset 2 (or the bloom filter) is returned to the controller 2. The controller 2 provides the response 10 to the user, which is either raw data or aggregated data as discussed herein.

As an alternative architectural possibility, the first filter ID set 1, 30 and the second filter ID set 2, 32 do not need to be returned to the controller. Instead, they could be passed directly from the first filter database to the second filter database, and from the second filter database to the target database respectively as indicated schematically by the dotted line arrows 36 and 38 moving to the right in FIG. 6.

Figure 7:
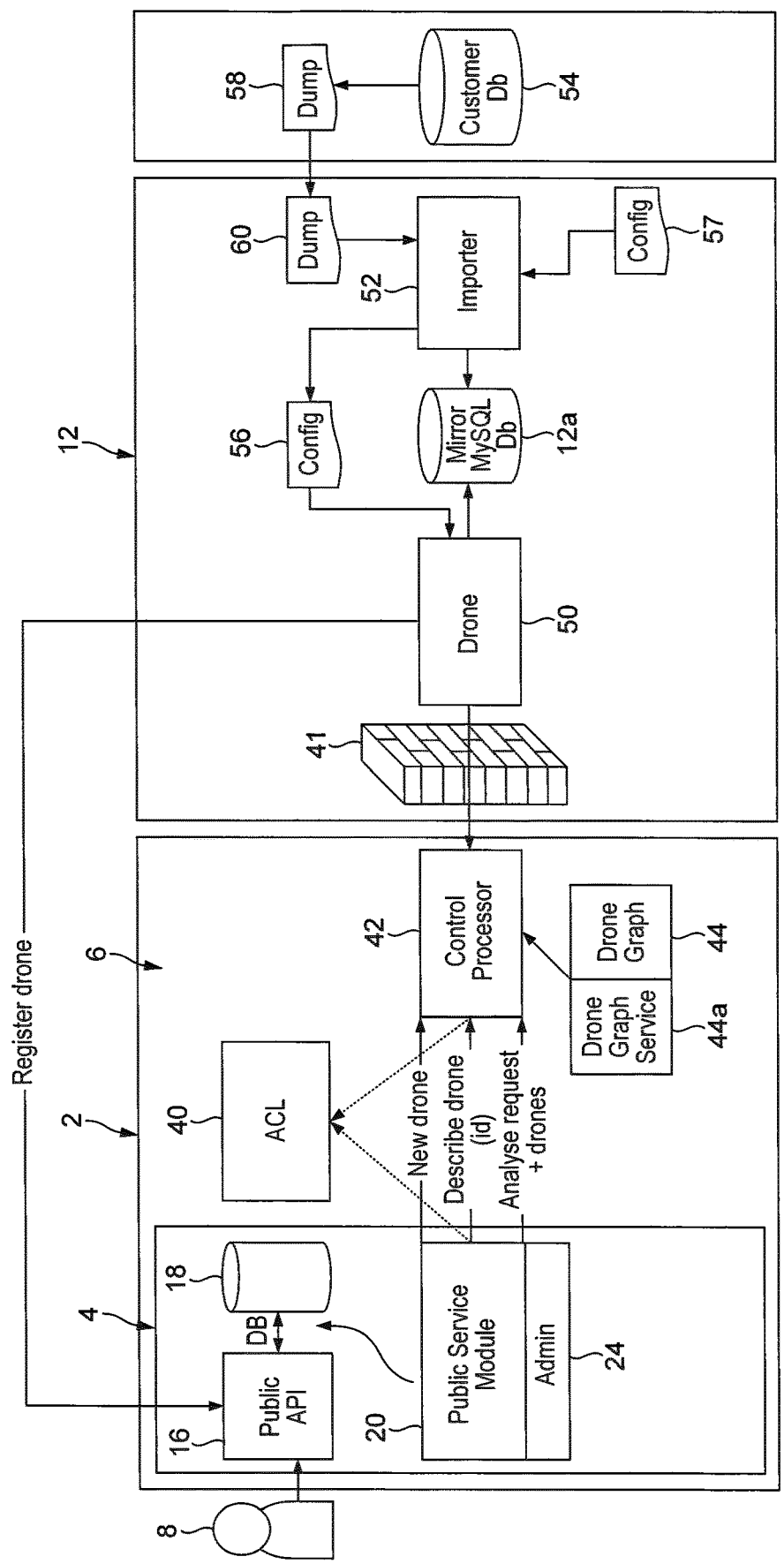
FIG. 7 is a more detailed architectural diagram of a computer system for accessing multiple independent databases.

FIG. 7 is a more detailed architectural diagram illustrating the component at the controller 2 and at a database site 12. The term "database site" is used herein to denote any site where one or more databases may be located. A database may alternatively be referred to herein as a "customer site", indicating that the database is owned by a particular customer. One distinct advantage of the described embodiments is that searches may be done across multiple databases which may be individually owned by different customers. One such database site is shown in FIG. 7. The public part 4 of the controller 2 comprises a public API 16 which is connected to a database 18 and to a public service module 20 which provides an administration interface 24.

The public API enables the user 8 to interact with the system. The administrator interface interact with an access central layer (ACL) components to set up permission, etc. for individual users.

Public parts 4 of the controller communicate with private components within the private part 6. The private components comprise the Access Control Layer (ACL) component 40, and a control processor 42. The access control layer 40 conditions outgoing requests according to the redaction policies of the querying customer and their subscription status. The processor component 42 is responsible for the processing functions which have been described, and for communication with database sites 12. Each database site comprises a firewall 41 for security purposes. The database site 12 incorporates a database 12a (one of the databases that has already been described). The database 12a is associated with a database agent or drone 50 which is the component which acts to facilitate receipt of queries from the controller 2 and the execution of running those queries over the database 12a.

It is understood that the above-described querying process can be applied to multiple datasets. If these datasets use different keys to identify data entries, then it is also understood that these querying processes may also be applied to these datasets if there is a way to correlate the different keys. For example, returning to FIG. 14, a query may be run over databases A and B by using database C to "translate" or "map" between the first key type (name) and second key type (email). Database C may therefore be referred to as a "mapping entity".

As shown in FIG. 14, the mapping entity (database C in this case) may not be able to translate all keys of the first type into a corresponding key of the second type—NameA's email address (A@com) is known, and NameB's email address (B@com) is known but NameC's is not. Hence, loss can occur when using a mapping entity to map (translate) keys from one type to another. The loss incurred depends on the particular mapping entity used and how many keys of the first type and keys of the second type it stores. Hence, if multiple mapping entities are available (e.g. multiple mapping entities each storing Names and Email Addresses as in FIG. 14) it is generally preferable to use the mapping entity which allows for the smallest amount of loss.

Figure 15:
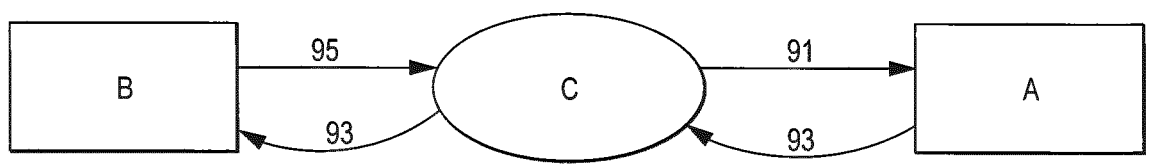
FIG. 15 illustrates directionality and loss in an intermediate dataset scenario.

Loss between datasets when using a mapping entity can be visualised as shown in FIG. 15. The weights represent the proportion of entries likely to be lost on a given "jump". This proportion can be represented as an integer (e.g. actual number of entries lost) or as a percentage of the source dataset. In this example, percentages are used.

In the example of FIG. 15, we expect 95% of entries in the source database B to match the mapping entity C, and 91% of entries in the mapping entity C to match the end database A. Similarly, if A were to be considered the source database, we would expect 93% of entries in the source database to match the mapping entity C, and 93% of entries in the mapping entity C to match the database B. These intersection weights also represent a type of loss as the join is made, and more importantly as the conversion is made using the intermediate mapping entity. In FIG. 15 the loss from B to A can be computed by combining the intersection weight from B to C (95%) and the intersection weight from C to A (91%).

Figure 16:
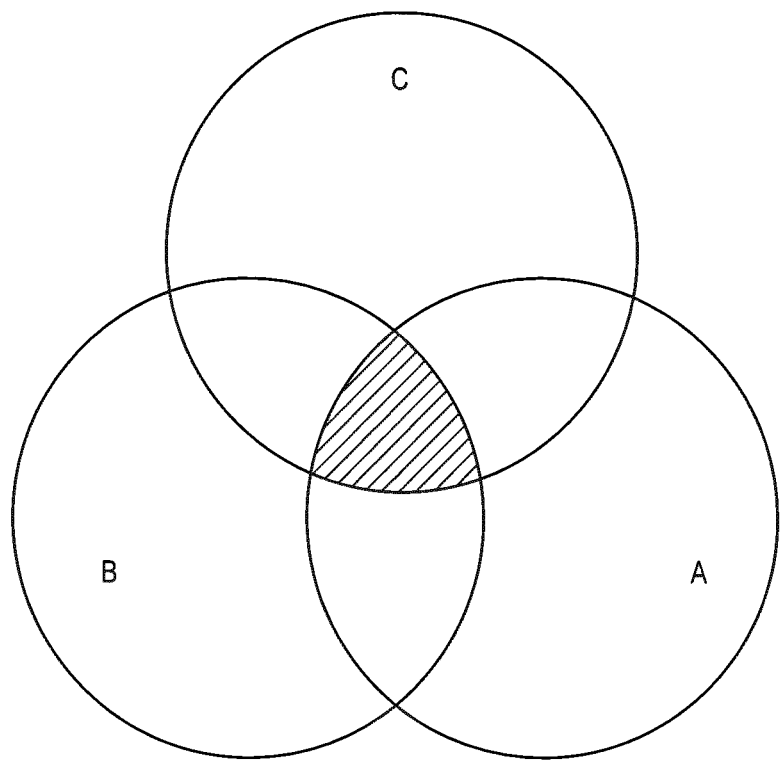
FIG. 16 is a diagrammatical representation of database intersection.

FIG. 16 illustrates this in more detail, using a Venn diagram. Assume a filtering key set is obtained from dataset B, and sent to mapping entity C which shares keys with B and with A. A new filtering set is created at the mapping entity C with keys supported by A. This filter is sent to the dataset A to provide the aggregated result. In this case for example the query may be to obtain aggregated salary from dataset A where gender from dataset B is male. Noting this case that the only information which results is that from the overlapping intersecting area (A intersect B intersect C). The intersection weight from B to A may be calculated to be 86.45% (95÷100×91÷100). This is an approximation, as the individual percentages (91% and 95%) strictly only describe the percentage of an entire dataset which is in the second dataset, but are being used here to approximate the percentage of a subset of that dataset which is in the second dataset (i.e. assuming an even distribution). It can be advantageous where there are multiple different intermediate mapping entities (or datasets) to optimise such aggregated results by using multiple intermediate data sets and/or selecting a preferred intermediate dataset based on the combined intersection weights. For example, preferably mapping entity C should comprise key mappings for all of the elements in the overlap of A and B shown in FIG. 16.

Note again that the values given in these examples are approximations. I.e. in FIG. 15, the 95% figure represents that 95% of the entries in dataset B (as a whole) are in dataset C, and the 91% figure represents that 91% of the entries in dataset C (as a whole) are in dataset A. It is not necessarily true that precisely 91% of the overlap between B and C (i.e. the 95% of B) is also present in A, but this figure can be used as a reasonable approximation.

Figure 17:
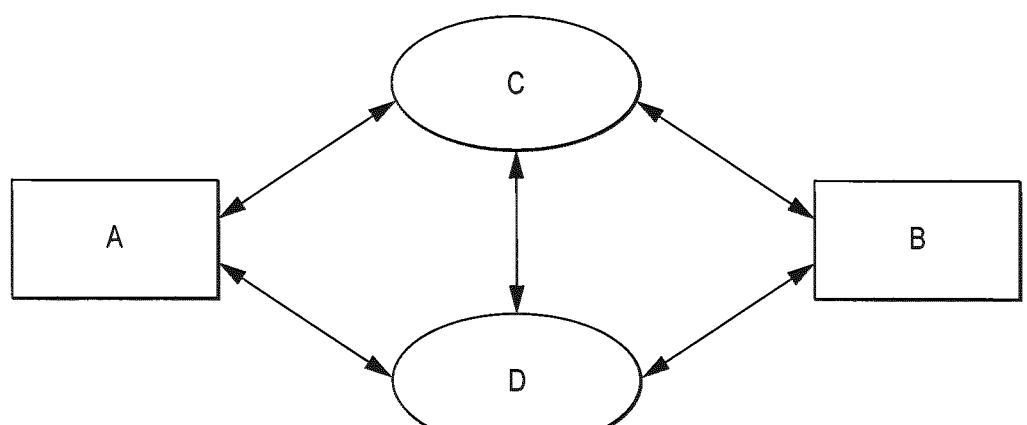
FIG. 17 shows a dataset joining scenario involving two possible intermediate datasets.
Figure 17A:
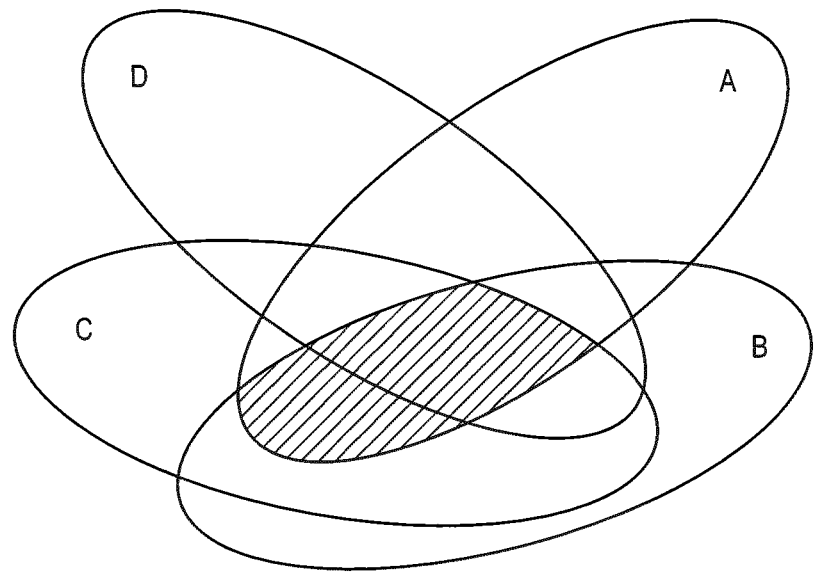
FIGS. 17a and 17b are Venn diagram representations of a more complicated database intersection.
Figure 17B:
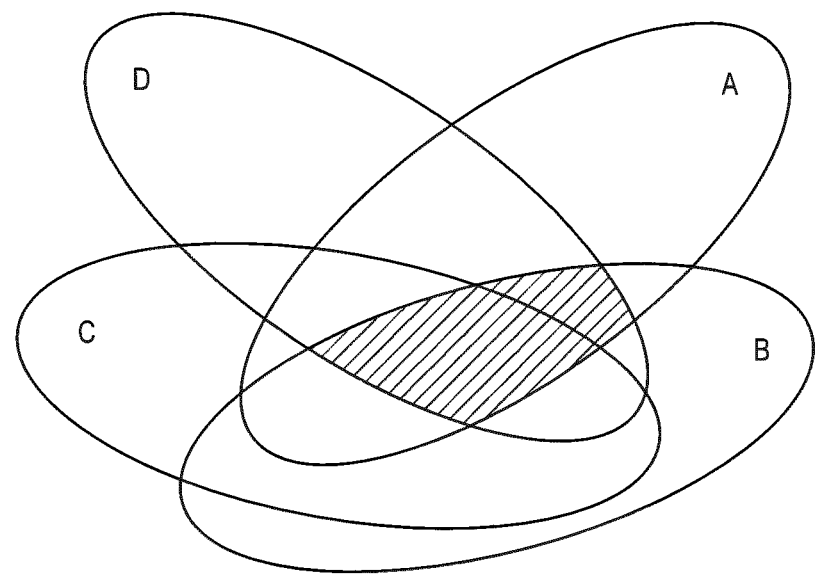

FIG. 17 shows a case where there are two intermediate datasets C and D. A shares keys with C and D, B the shares keys with C and D, and also C and D share keys. Now, to run the query of getting an aggregated salary from dataset A where gender from dataset B is male, we can use a first "path" in which C is the intermediate mapping entity. In this case, a set of keys is obtained from B that identify males. This set of keys is sent to C and provides a set of keys of the key type that can be understood by A. This set of keys can then be used to create an aggregation of the salary, as shown by the shaded area in FIG. 17a. Similarly, a set of keys can be obtained from B that identify males, this set of keys can be sent to D and a set of keys can be created that can be understood by A. This set of keys can be sent to aid to create an aggregation of the salary as shown in the shaded area of FIG. 17b. By use both of the intermediate datasets C and D, the coverage of the aggregated result is increased.

Intersection weights are used to determine whether one 'path' should be used, or whether multiple path should be used. If only one path is to be used, an optimum pass can be selected using the intersection weights (and possibly other criteria). If W (X, Y) is the intersection weight from X to Y, for X, Y being datasets, then table 1 (below) shows the possibilities of paths in FIG. 17.

| | | | |
|---|---|---|---|
| W(B,A) = | W(B,C)*W(C,A) | Via C | (1) |
| | W(B,D)*W(D,A) | Via D | (2) |
| | W(B,C)*W(C,A) + W(B,D)*W(D,A) − W(B,D)*W(D,A)*W(D,C) = W(B,C)*W(C,A) + W(B,D)*W(D,A) − W(B,C)*W(C,A)*W(C,D) | Via C&D | (3) |

Path 1: send keys from B to C, convert keys at C and send keys to A.

Path 2: send keys from B to D, convert keys, send keys to A.

Path 3 send keys from B to C and D; convert keys; send union of two keysets to A.

Note that while path 3 might provide the better set of aggregated results, it increases the number of queries that are needed to respond to the original query, and also increases traffic. Therefore the improved result has to be weighed up against these parameters. The decision making general case is set out below:

Find "all" paths P from B to A (e.g. P={B-C-A, B-D-A})

Calculate the distance $d(p\_i, p\_j)$ between all paths for i,j in $\{1, \ldots, \#P\}$ $d(p\_i, p\_j)=1-\#\{x|x \text{ in } p\_i \text{ and } x \text{ in } p\_j\}/\#\{x|x \text{ in } p\_i\}$ Properties of d:

$d(p\_i, p\_j)$ is mostly different from $d(p\_j, p\_i)$ $d(p\_i, p\_j)=0 \Leftrightarrow$ all elements from $p\_i$ are in $p\_j$ Drop one path $p\_i$ when $d(p\_i, p\_j)=0$ when $i \mathrel{!}= j$ Note that "all paths" here may not (and indeed preferably does not) include every possible path from B to A, as this may be a very large number of paths. It is possible to remove some paths from this set (i.e. it is possible to remove some paths which are possible, but are guaranteed to be worse than at least one other path and so can be omitted). Hence, "all" paths refers to a set of paths obtained once the worse paths are removed. The process for determining which paths can be ignored is outlined below:

Let WP(p) be the weight of a path p.

Let n be the number of nodes in p.

Define WP as: $WP(p)=W(p[1], p[2])*W(p[2],p[3])* \cdots *W(p[n-1], p[n])$

Using one path p:

$W(B,A)=WP(p)$

Using two paths p_i, p_j:

$W(B,A)=WP(p_i)+WP(p_j)-WP(p_i)*(1-d(p_i,p_j))$

Using N paths:

$$W(B, A) = \sum_{i=1}^{N} WP(p_i) - \sum_{i=2}^{N} WP(p_i)\left(1 - \prod_{j=1}^{i-1} d(p_i, p_j)\right)$$

Figure 18:
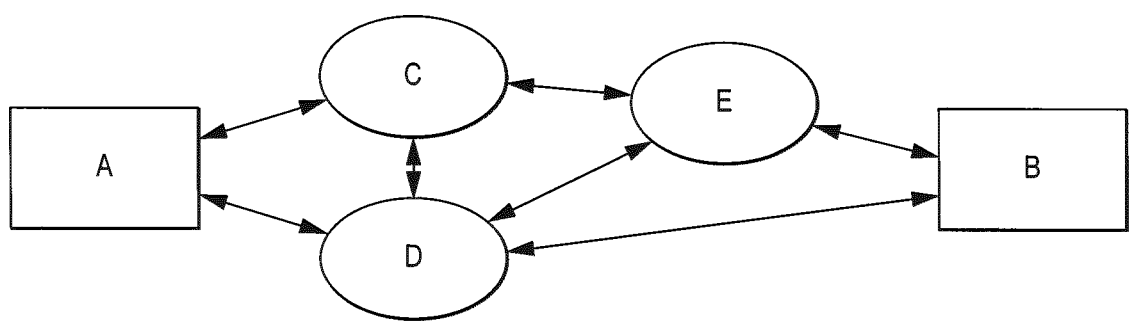
FIG. 18 shows an example dataset intersection involving multiple chained intermediate datasets.

In general, decision-making involves minimising on all possible path combinations a number of heuristics including expected traffic, execution time, costs, error rate and loss of values (noting that the loss is one minus the intersection weight). A further example is shown in FIG. 18, where an additional intermediate mapping entity is provided. In this example, A, C and D share keys, C, D and E share keys and B, E and B share keys. So in order to decide the best route, all cycle free paths from B to A are examined:

1. B-D-A
2. B-E-C-A
3. B-D-C-A
4. B-D-E-C-A
5. B-E-D-A
6. B-E-D-C-A

When three datasets share a key (e.g. B, D, E), then it follows that $\#(B \cap E) \geq \#(B \cap D \cap E)$. This removes a lot of paths:

B-E-D will never be chosen because B-D is always better

D-C-A will never be chosen because C-A is always better

Hence, paths 3-6 (shown above) can be removed.

The above-outlined procedures therefore provide for a first dataset to be joined with a second dataset, when the first dataset identifies its data entries by keys of a first type and the second dataset identifies its data entries by keys of a second type. This comprises selecting an intermediate mapping entity storing association between keys of the first type and keys of the second type which is therefore able to convert between the two key types. The mapping entity to use is selected based on the intersection weight between the first and second data sets via each of a number of possible intermediate mapping entities (the intersection weight being the proportion of overlapping data entries between the first and second datasets). At least one of the mapping entities is chosen to be used in the conversion based on these calculated intersections.

Hence, each mapping entity may be considered a "path" from the first dataset to the second dataset. A given path may comprise multiple mapping entities, in series—i.e. one converting key of a first type to key of a second type, and then another converting key of the second type to key of a third type. In another scenario, more than one path can be provided between the first and second data sets. Paths may be used singly or continued in sets.

Once the possible intersection values achievable using each of the mapping entities are determined, the method can include determining whether to use a single best one of the multiple paths or more than one of the multiple paths. For example, the "best" mapping entity to use may be the mapping entity with the highest achievable intersection.

When the single best path is chosen, a respective set of path parameters for utilising each of the multiple paths may be defined, which allows the best single path to be selected based on optimising a heuristic, such as speed or accuracy, of the set of path parameters.

Multiple paths may be combined. That is, an overlap intersection weight between an intermediate mapping entity of a first one of the multiple paths and an intermediate mapping entity of a second one of the multiple paths in each set of possible multiple paths can be determined, and which set of multiple paths to utilise can be determined based on the overlap intersection weights. For example, a first path achieving 80% intersection may be combined with a second path also achieving 80% intersection if an overlap between these two paths (between the respective mapping entities) is less than 100% (meaning that they are not equivalent paths), because this means that there is knowledge to be gained in the combination. In other words, each mapping entity allows for the conversion of at least one other data entry from the first dataset to the second dataset that the other mapping entity does not. Using both will therefore allow for a higher intersection than either single one on its own.

An overlap intersection weight between the two mapping entities of 100% (or equivalent) may therefore be used as an indication that a single best path should be used. In other words, it is not worth using multiple paths as no further intersection will be gained. An overlap intersection of a lower threshold may be used to make this decision (e.g. 98%) depending on the implementation.

To facilitate the above, the intersection weights may be stored in a data structure in which each intermediate mapping entity is held in association with its intersection weights between each of the first and second datasets.

The step of selecting may be based on a first intersection weight which represents the overlap in a first direction from the data set to the intermediate mapping entity.

The step of selecting may also be based on second intersection weight in a second direction from the intermediate mapping entity to the data set.

Although described herein mainly with reference to percentages, it is understood that any other representation of the "proportion" of intersections may be used. E.g. the proportion may be based on the absolute number of overlapping keys with the intermediate mapping entity, relative to the size of the dataset.

When multiple mapping entities are used (e.g. when the overlap between the respective paths is low enough): the first data set is joined with the second data set using one of the multiple intermediate mapping entities; and the first data set is joined with the second data set using a second one of the multiple intermediate mapping entities; and joined entries are combined resulting from the these two steps.

The parameters may include quality and speed of executing a join using the single best path.

There may be circumstances where a dataset comprises multiple separate databases which form a group. As described in our GB Application No 1714655.6, groups may be formed statically or dynamically. It can be helpful in the context of determining intersections for such a group to 'appear' as a single dataset. One mechanism for achieving this is to use a hyperloglog mechanism. The key count of each database within the group can be represented with a set of hyperloglog registers, which can be combined to represent the group as a whole for the purpose of calculating an intersection with an intermediate mapping entity using the methods outlined above. In addition, the hyperloglog registers allow an approximate calculation of intersections to be accomplished, without having to create a complete model of the group when a new database is added or a new group is created. All that is needed is to generate hyperloglog registers for the new database, or combine existing hyperloglog registers differently to obtain an approximate, quick determination of an intersection.

The database site 12 shown in FIG. 7 has a single database and a single drone. However, there may be a plurality of drones provided for a particular site, each associated with a distinct database. In the present embodiment, there is a 1:1 relationship between drones and databases. The database site 12 comprises an importer module 52. The importer module 52 plays the role of importing data from a "raw" customer database 54 into the database 12*a*, against which queries can be run. A configuration file 57 can be provided for controlling the operation of the importer. For the sake of completeness, reference numeral 58 denotes a database dump received from the customer database 54, and reference numeral 60 denotes the transfer of that database dump into the database site 12 so that it can be provided to the importer module 52. The configuration file which is supplied to the importer can be manually generated or automatically generated. It defines in particular a set of identifiers which are to be used by the database 12*a* such that all databases against which queries can be run have at least one common identifiers. This could, for example, be personal information such as a name or email address. In addition, certain items of data to populate the data entries may be required by the configuration file. The importer module 52 supplies a configuration file 56 to the drone 50 to inform the drone about the structure of the database 12*a* against which queries can be run. An example of the configuration file 56 is given in FIG. 7*a*.

User requests are handled through the public API via the public service module 20 to the control processor 42. The message "analyse request+drones" in FIG. 7 denotes a request from a user to analyse an input query and to identify the appropriate drones to which the split queries should be sent. New drones can be added by the administration interface 24 of the public service module 20. The drone registration process is described below.

Figure 19:
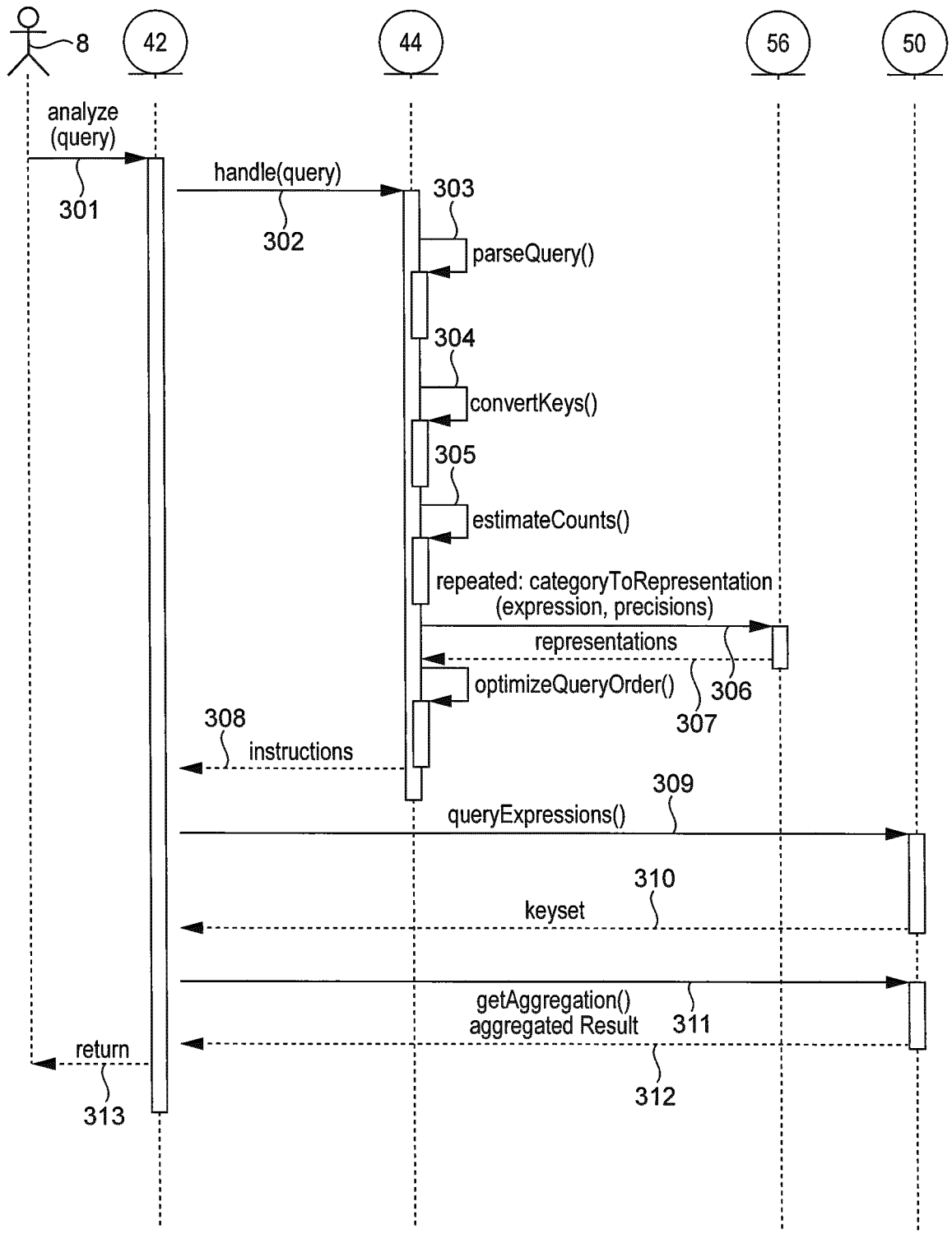
FIG. 19 shows an example overall system architecture.

FIG. 19 shows a diagram illustrating an overview of the flow within the system architecture for applying a query to multiple datasets to return a result. This puts the inventive aspects described in the present application into a broader use context. For example, to run a query for salary data for people aged 41 and above (e.g. salary:age>40): a first dataset having age values but no salary data can be used to identify names (as an example of a key) of people who are older than 40; these names are then provided to a second dataset having salary data but not age values in order to return the salary data of those people previously identified using the first dataset (who are therefore over 40).

The datasets used (the multiple datasets above) can be determined based on intersection data between datasets. For example, respective indications of intersections between a user's dataset and each of a plurality of further datasets may be determined.

A higher intersection means it is more likely that a given entry, as identified by a key such as name, is present in both datasets (i.e. that a given entry from the user's dataset is in the respective further dataset). A further dataset having a higher intersection with the user's dataset than another dataset therefore contains more data entries with keys matching a key from the user's dataset than the other dataset. Therefore, the intersection value(s) may be presented to the user 8 for the user to select which dataset(s) he wishes to run his query over. Alternatively, a dataset pair having the highest intersection may be automatically selected.

A given entry in the first dataset may match with a single one entry in the second dataset, or may match with two or more entries in the second dataset. In the latter cases, it may be useful for a user to be informed of how much duplication there is.

Hence, in an example, said comparing further comprises determining an indication of a duplication level of entries in the first and second datasets. The duplication level represents the number of times entries in the first dataset are duplicated in the second dataset, and can be calculated on a per-entry basis. That is, the number of times a given entry appears in the second dataset can be determined using, for example, a counting filter according to embodiments set out in the detailed description. The duplication level may then be the sum of the duplication number of all entries in the first dataset. This could be presented as an absolute number, or as a proportion of the intersection (e.g. a ratio or percentage).

In general, a user may desire to have a high intersection and a low duplication level. Hence, in an example, the method further comprising determining a relationship between the intersection and the duplication level. The relationship for a given dataset pair may be a pair of numbers (e.g. integers) defining the intersection and the duplication level, or may be a mathematical relationship between the two such as a ratio. For example, the user may desire a high intersection to low duplication level ratio. The relationship may be presented to the user, or may be used in automatically selecting a dataset (e.g. automatically selecting a dataset having the highest intersection to duplication level).

When counting filters are used, the user 8 can also be presented with information concerning the "duplication level" of his data entries within the second dataset. That is, not only can the number of data entries in the user's dataset which match (any) entries in the second dataset be determined (a "naïve" intersection value), but also the total number of times each of the data entries matches with an entry in the second dataset (a "gross" intersection value) can be determined. The user may be presented with the gross intersection value, or a difference between the gross intersection and the naïve intersection (thus being an indication of the amount of duplication). For example, the user can be presented with a histogram illustrating the number of data entries in his dataset which match only one entry of the second dataset, the number of data entries in his dataset which match two entries of the second dataset, the number of data entries which match three entries of the second dataset etc.

The query is input, for example by the user 8 entering the query via the public API 16 and received by the control processor 42 with a request 301 to analyse the query. The input query is then analysed to determine one or more datasets to which the query should be applied. This involves analysing the expressions of the query in order to determine at least one dataset having relevant data (e.g. an expression "age>40" requires a dataset comprising age data).

The analysed query is then passed to a drone graph service 44a with a request 302 to handle the query. The drone graph service 44a comprises the drone graph 44 enabled with some processing functionality. That is, the drone graph service 44a comprises the drone graph 44 and a processor (not shown) for performing operations on the drone graph 44 (e.g. create, read, update, delete operations) including at least those described herein.

The drone graph service 44a parses the query—303 (this may be performed by a dedicated parser separate from the processor). After parsing the query, the drone graph 44 itself is used by the processor of the drone graph service 44a to convert 304 keys of one dataset into a type recognisable by the other dataset (e.g. if the first dataset uses names of people and the second dataset uses email addresses, then an intermediate mapping entity storing associations between names and email addresses is used to either convert names to email addresses of vice versa).

The drone graph service 44a then estimates 305 the size of the query based on statistical data about the datasets (e.g. percentiles of numeric values, most common values for text or Boolean values etc.).

In step 306, data categories in the query are analysed by the drone graph service 44a to optimise a match between a representation of that category in the query and an available representation in the dataset. The dataset may store data of a particular category according to more than one representation. That is, the configuration file 56 of a particular drone may specify multiple representations of a data value in a certain category, to enable better matching with an input query. The representations which are available are returned 307 to the drone graph service 44a. The drone graph service 44a selects which representation is to be used based on maximising an expected returned query size. At step 308, the drone graph service 44a returns instructions to the control processor 42 to use the selected representation.

The query is then run over this pair of datasets by the control processor 42 using the representation indicated in the instructions of step 308. The first dataset is accessed 309 (represented here by drone 50) using an expression of the query (e.g. age>40) to generate a set of keys ("keyset") being the keys which represent data entries satisfying the expression (e.g. a set of names of people aged over 40 in the first dataset).

This keyset is returned 310 by the drone 50 to the control processor 42 which then provides 311 the keyset and the querying expression to the second dataset (also represented by drone 50 in FIG. 19) to aggregate data entries from the second data set. This comprises the drone of the second dataset determining entries of the second dataset having keys which match a key of the keyset and aggregating the values according to the querying expression. For example, the querying expression may be for salary data in which case the drone 50 aggregates salary data for those people in the second dataset who are identified in the keyset provided in step 311. The result (e.g. salary data for people over 40 years of age) is then returned 312 to the control processor 42 which can then provide 313 the result to the user 8.

Drone Registration Process

When a new database is to be added to the system, a new drone 50 is initiated at the location (e.g. customer site) of the database. An administrator at the controller 2 manually instigates a new drone registration process which contacts the new drone to cause the new drone to issue a registration request. The administrator adds a drone and gets a JWT (text) and supplies this text to someone who uses this text at the customer site 12. When the drone starts it sends a request including the JWT to the public API 16. On success the response contains a certificate which the drone needs for communication between 42 and 50, and a drone identifier. Drone identifiers are held in a graph 44 at the controller 2. The list can be made accessible to customer with access constraints. The drone identifier identifies the drone and its location address to enable queries to be sent to it. Each drone has an association with its database at the customer site. The drone ID also indicates the attributes available to be searched in the database associated with that drone.

As mentioned above, in the response that is returned to a requesting user, the raw set of data entries which have been identified as a result of the multiple queries executed across multiple databases may be returned. Alternatively, the entries can be aggregated into groups according to attributes of the entries. For example, the groups could comprise statistical bins, each bin containing result entries with attributes in a defined parameter range for that attribute. The aggregated data is supplied to a user.

To increase anonymization (that is to decrease the likelihood of a particular data entry in a sparse set being able to be tied to a particular individual who could be identified) a redaction threshold can be applied of a minimum number of entries per bin. Another redaction threshold for entries in all bins could also or alternatively be applied, e.g. "small" bins can be removed.

As mentioned above, the embodiments described herein enable results across a number of different databases to be returned in response to a single query, in a manner which is "hidden" from a requesting user. Moreover, there is no need to join the records of the databases into a common dataset, so there is no requirement for the databases to be under any kind of common control or ownership.

The databases may be at separate geographical locations. The databases may be at separate IP addresses.

Figure 8A:
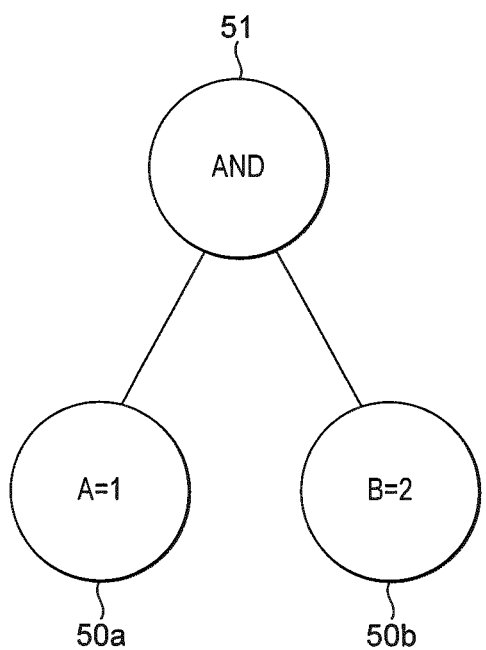
FIG. 8a and FIG. 8b are diagrams illustrating filtering expressions with logical operators.
Figure 8B:
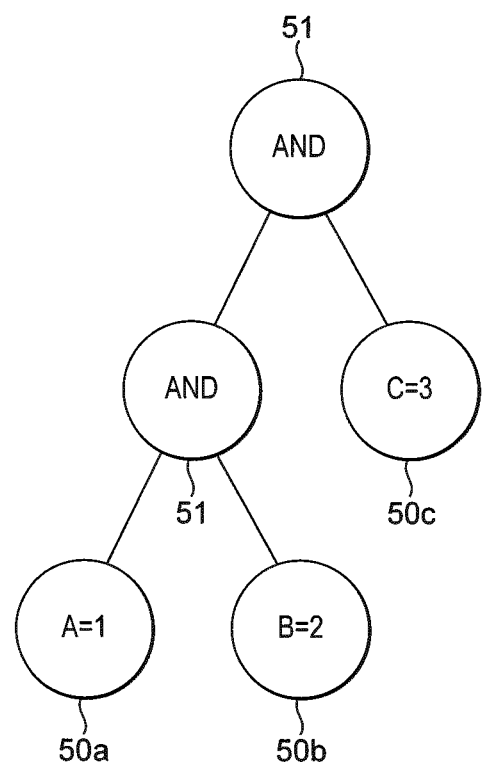
Figure 9:
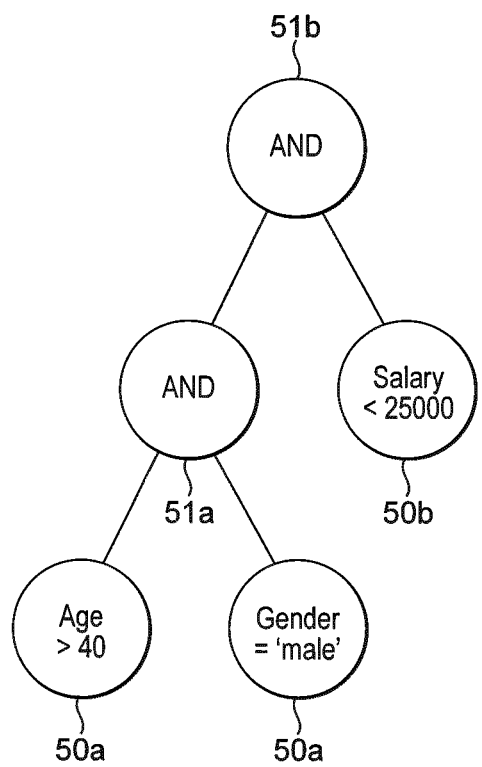
FIG. 9 is a diagram illustrating the process of querying multiple drones with a single joining key.
Figure 10:
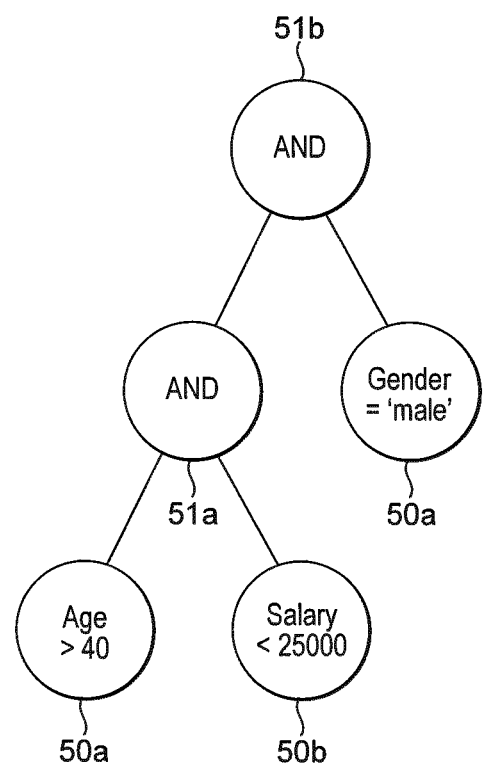
FIG. 10 is a diagram illustrating the process of querying multiple drones with a single joining key.

FIG. 8 to FIG. 10 exemplifies the process of querying multiple drones using a single joining key. For example, a combination of filtering expressions A=1 AND B=2 is shown in FIG. 8a to illustrate the use of an "AND" operator 51 for cross examining returned results at the drones 50a, 50b. Wherein an extra filter expression C=3 at drone 50c can be added and the filtering expressions may be represented as a tree in FIG. 8b, i.e. A=1 AND B=2 AND C=3. Each of the drones 50a, 50b and 50c is appropriated with a respective independent database.

In FIG. 9, the expressions A, B and C in FIG. 8b are replaced with actual filtering expressions (Age>40), (Gender="male") and (salary<25000). In this particular example, drone 50a contains both age and gender information and drone 50b contains salary information. Since the filtering expressions (Age>40) and (Gender="male") are both operable using a common operator (AND) 51a at drone 50a, they can be operated using a single query ("age>40 and gender="male").

In a first scenario where neither drones 50a nor 50b is the target drone, they both count the number of entries fitting their respective filtering expression, as follow, Count ("age>40 and gender="male") in drone 50a; and Count ("salary<25000") in drone 50b;

Assuming the count is relatively lower in drone 50a than that in drone 50b, the two drones then carry out filtering and each returns a filtering set, as follow, Query ("age>40 and gender="male") in drone 50a and return filtering ID set S1; and Query ("salary<25000" and filtering set ID set 1) in drone 50b and return filtering ID set S2 which returns a filtering ID set S2 at most the same amount of elements than in the filtering ID set S1.

The return filtering ID set S2, which has a higher count, is then sent to the target drone for generating the distribution.

In a second scenario where drone 50b is the target drone, no counting is required at the drones 50a and 50b, since drone 50b will be used to generate the distribution, e.g. the operation comprising the step of Query ("age>40 and gender="male") in drone 50a to return filtering set S1, and subsequently sending filtering expression ("salary<25000") and said filtering set S1 to drone 50b to generate the distribution.

A third scenario is shown in FIG. 10 where the scenario (A+B) and C is changed to (A+C) and B. The query comprises the filtering expression to "(Age>40 and gender='male') and salary<25000". The process is equivalent to that of the first scenario.

Example queries have the following form:
Target expression WHERE filter expression.

Figure 11:
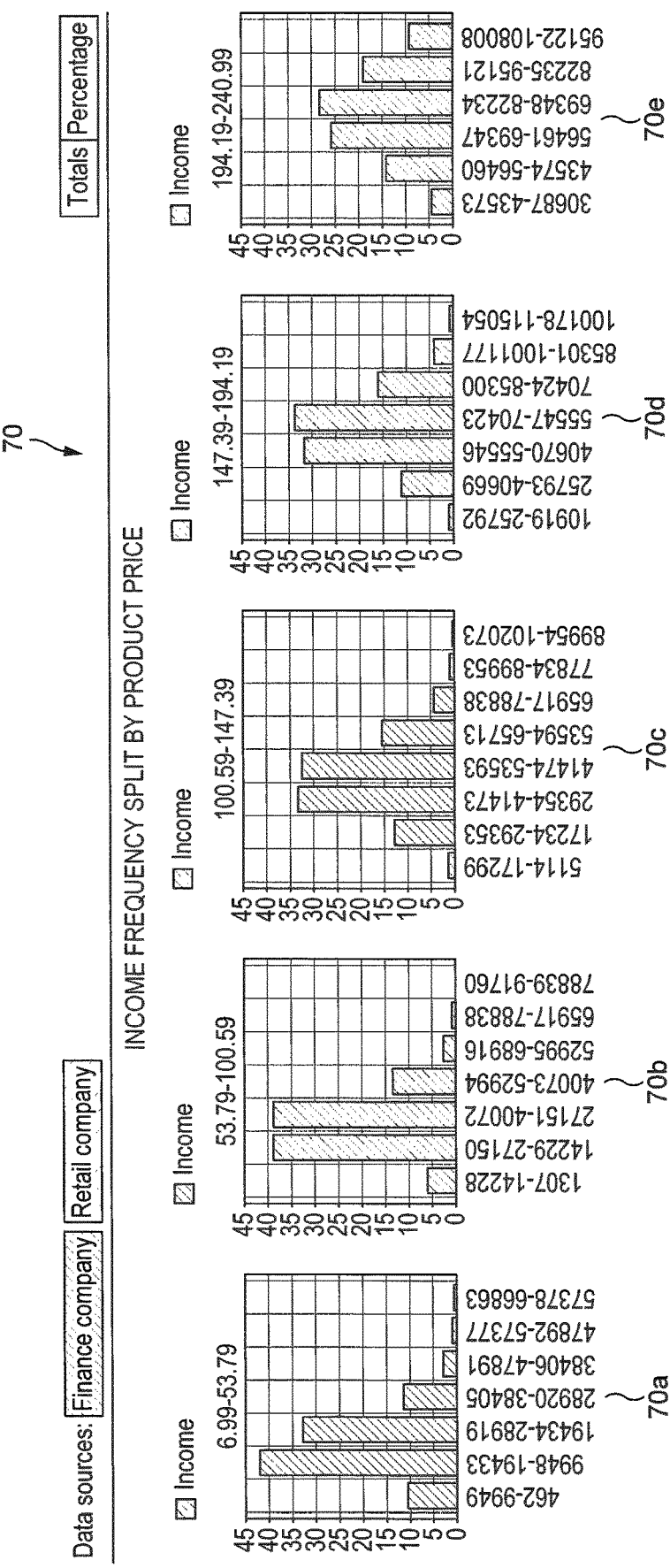
FIG. 11 shows an example output of a user screen.

FIG. 11 shows an example output of a user screen 70 for a user which has requested to join data from a finance company and a retail company.

The query Q1 underlying this is:
Distribution (Income) WHERE Distribution (Product Price)

The data shown in the bar graphs 70a-70e in FIG. 11 is income data which shows the number of people having income in certain ranges derived from a finance company. The numerical range on each bar graph differs and represents a product price range derived from the retail company.

Figure 12:
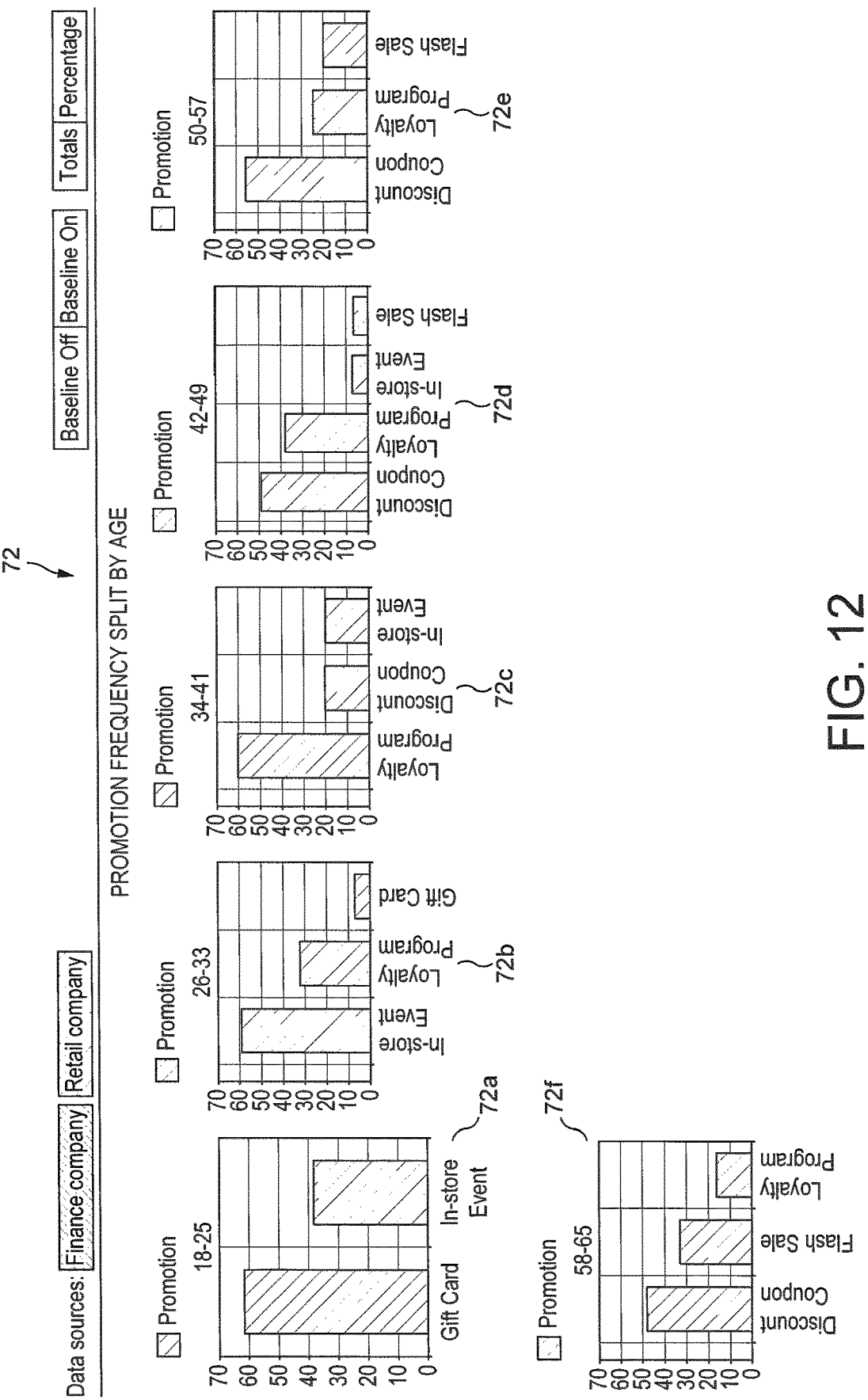
FIG. 12 shows another example output of a user screen.

FIG. 12 shows another example. In this example the data from the finance company indicates numbers of people in certain age range with certain income bracket, which is used to provide different bar graphs 72a-70f from the retail company concerning promotion types.

The query Q2 underlying this is:
Distribution (Promotion) WHERE (Distribution (Age) WHERE income>60000)

Figure 13:
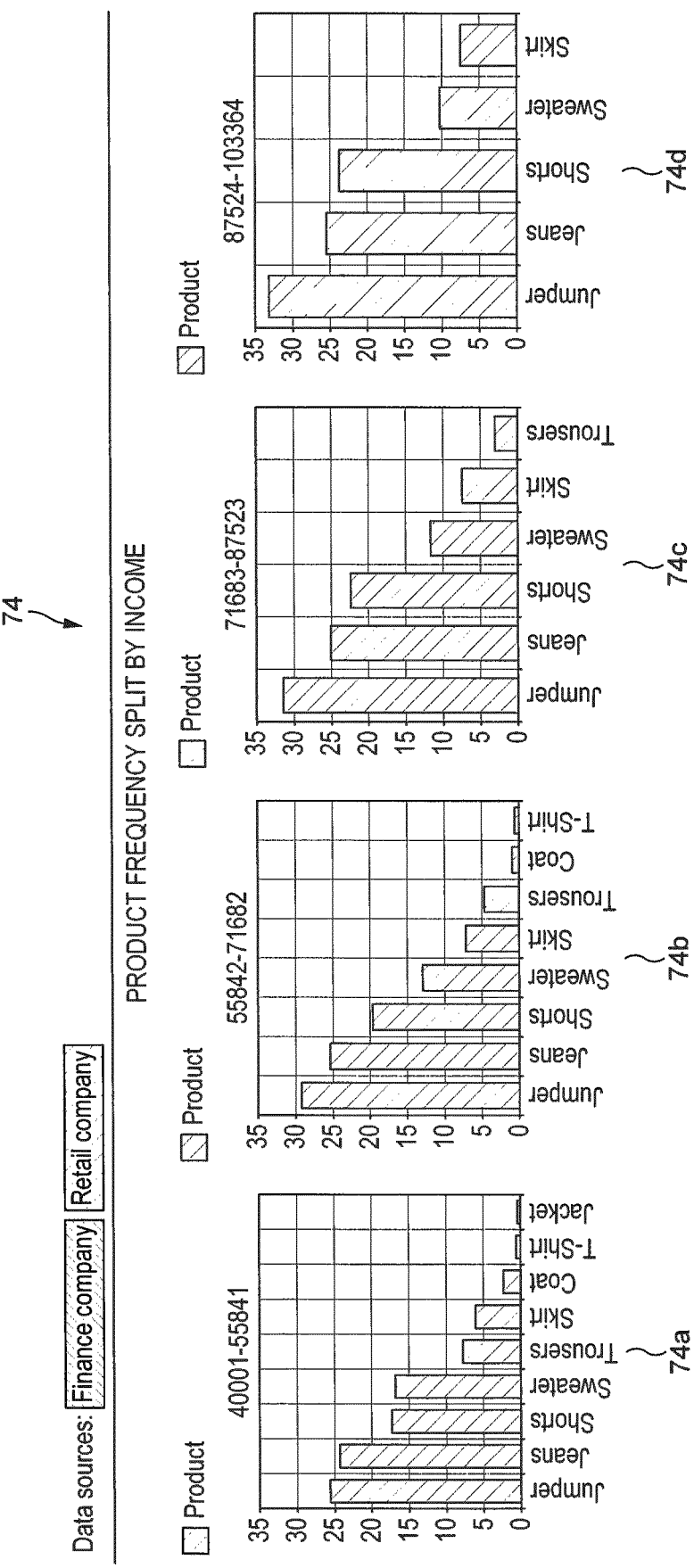
FIG. 13 shows yet another example output of a user screen.

FIG. 13 shows another example where the data from the finance company is used to provide income ranges which are used to generate bar graphs 74a-70d of product frequency from the retail company.

The query Q3 underlying this is:
Distribution (Product) WHERE (Distribution (income) WHERE income>40000 and product_price>80)

Some examples of filter expressions and their use are illustrated in the following table.

| Filter expression | Example use |
| --- | --- |
| Operator (>, >=, =, !=, <, <=) | age >40, Age >=40, town = "London" |
| Operator between | age between 25 and 30, town between 'a' and 'b' |
| Operator in | age in (15, 16, 24, 25), postcode in ('RG21 1CE', 'RG21 1CD') |
| Operator like | postcode like 'RG21 %' |
| Negated | Not age >40 |
| Combined via AND | age >40 and age >50, town >'a' and town <'b' |
| Combined via OR | age >60 or age <15 |

These example filter expressions may be applied to form the following example queries:
distribution(income) where (distribution(gender) where (distribution (age) where job_status !='unemployed')), represents "how is income distributed over genders and ages for not unemployed people".
distribution (private_health_insurance) where (distribution(age) where (distribution(visits_to_doctor) where age>50 and (income>45000 or retired=true))), represents "how many people have a private health insurance when they are over 50 and earn more than £45000 or are retired" The results are split up into 2 groups that is "age" and "visit_to_doctor" group".
sum(purchases) where (distribution(purchase_method) where (distribution(town) where (distribution)purchase_month and purchase_time>'28-10-2015') where age between 18 and 29 and gender='female", represents "how much money have young females spend on purchases split up in the towns they live in, the month they made the purchase, and the method they used in the last 12 months".

As mentioned above, the importer module 52 defines the identifiers which will be used in common between the databases. Although it may be desirable to have identifiers which uniquely identify particular entries, it is not necessary for implementation of the concept described herein. It is anticipated that there may be errors where identifiers do not uniquely identify an individual entry, for example, customers having the same first and last names, or a single customer having multiple email addresses. However, error rates in aggregation may be acceptable in some cases. If error rates are not acceptable, mechanisms could be put in place to improve the accuracy, or to triage the identifiers to make sure they are unique.

It is noted that different customer databases may adopt different column headers for the same expression, therefore the importer module can be arranged to carry out normalisation on the column headers so as to produce a unified category (or identifier) for a given expression. The normalised data are exported from the "normal" database 54 to the database 12a against which queries will be run, the database 12a constituting an intermediate recipient database for the purpose of running the queries. It is possible to share high level data statistics between the databases once normalisation is finished, or while the database is being normalised. Normalisation can be carried out manually or automatically.

The invention claimed is:

1. A computer-implemented method of joining a first dataset with a second dataset, the first dataset configured to store a set of data entries each identified by a respective key of a first type and the second dataset configured to store a second set of data entries identified by a respective key of a second type, the method comprising:
   providing a set of possible intermediate mapping entities, each mapping entity comprising a mapping database mapping keys of the first type and associated respective keys of the second type, each key of the second type identifying a data entry of the second set of data entries that matches a data entry of the first set of data entries identified by the associated first key;
   determining a first intersection weight between the first dataset and each intermediate mapping entity, the first intersection weight being the proportion of data entries in the first data set which match keys of the first type in the intermediate mapping entity;
   determining a second intersection weight between the second dataset and each intermediate mapping entity, the second intersection weight being the proportion of keys of the second type in the intermediate mapping entity that match data entries of the second data set;
   computing a respective third intersection weight for each intermediate mapping entity by combining the first and second intersection weights, the third intersection weight representing a respective loss when a join is made between the first and second data sets using that intermediate aping entity;
   selecting one or more intermediate mapping entity from the set of possible intermediate mapping entities based on the respective loss;
   accessing the selected intermediate mapping entity to transform the set of keys of the first type into a generated set of keys of the second type for use in applying a query at the second data set; and
   applying the query at the second data set using the generated set of keys of the second type, including determining at least one matching data entry of the second data set which is identified by a key of the second type which matches one of the generated set of keys of the second type.

2. A method according to claim 1, wherein the step of selecting an intermediate mapping entity comprises locating a plurality of possible mapping entities and defining multiple paths from the first dataset to the second dataset, each path including at least one of the mapping entities.

3. A method according to claim 2 comprising the step of determining whether to use a single best one of the multiple paths or more than one of the multiple paths.

4. A method according to claim 3 when it is determined to use a single best paths, the method comprising the step of determining a respective set of path parameters for utilising each of the multiple paths, and selecting the best single path based on optimising a heuristic of the set of path parameters.

5. A method according to claim 3, comprising the step of determining an overlap intersection weight between a first intermediate mapping entity of a first one of the multiple paths and a second intermediate mapping entity of a second one of the multiple paths in each set of possible multiple paths by combining the third intersection weights of the first and second intermediate mapping entities, and determining which set of multiple paths to utilise based on the overlap intersection weights.

6. A method according to claim 5 comprising the step of using the overlap intersection weights to determine that a single best path should be utilised.

7. A method according to claim 1, wherein the intersection weights are stored in a data structure in which each intermediate mapping entity is held in association with its intersection weights between each of the first and second datasets.

8. A method according to claim 1, wherein the step of selecting is based on a first intersection weight which represents the overlap in a first direction from the data set to the intermediate mapping entity.

9. A method according to claim 1, wherein the step of selecting is based on a second intersection weight in a second direction from the intermediate mapping entity to the data set.

10. A method according to claim 1, wherein the proportion is based on the absolute number of overlapping keys with the intermediate mapping entity, relative to the size of the dataset.

11. A method according to claim 4, wherein the proportion is the number of overlapping keys as a percentage of the size of the source dataset.

12. A method according to claim 1, wherein the step of selecting the intermediate mapping entity comprises locating a plurality of possible intermediate mapping entities, determining for each of the possible intermediate mapping entities the intersection weight between the first data set and the intermediate mapping entity, and between the second data set and the intermediate mapping entity, and selecting a preferred intermediate mapping entity by comparing the combined intersection weights between the first and second data sets and each intermediate mapping entity and selecting the greatest combined intersection weights.

13. A method according to claim 1 comprising joining the first data set with the second data using multiple selected intermediate mapping entities.

14. A method according to claim 7 comprising:
   a first step of joining the first data set with the second data set using one of the multiple intermediate mapping entities, and
   a second step of joining the first data set with the second data set using a second one of the multiple intermediate mapping entities;
   combining joined entries resulting from the first and second steps.

15. A method according to claim 3, wherein the path parameters include quality and speed of executing a join using the single best path.

16. A computer comprising:
   a memory holding a data structure which stores intermediate mapping entities in association with intersection weights between the intermediate mapping entity and each of first and second datasets, the first dataset configured to store a set of data entries each identified by a respective key of a first type and the second dataset configured to store a second set of data entries each identified by a respective key of a second type, and each intermediate mapping entity comprising a mapping database storing keys of the first type and associated respective keys of the second type, each key of the second type identifying a data entry of the second set of data entries that matches a data entry of the first set of data entries identified by the associated first key, and a processor configured to execute a computer program which when executed carries out the method according to claim 1.

17. A computer according to claim 16, wherein the memory additionally holds for each intermediate mapping entity intersection weights with other intermediate mapping entities, the intersection weight between two intermediate mapping entities being a proportion of shared keys between those intermediate mapping entities.

* * * * *